(12) United States Patent
Ohnishi et al.

(10) Patent No.: US 10,497,265 B2
(45) Date of Patent: Dec. 3, 2019

(54) VEHICLE SYSTEM, METHOD OF PROCESSING VEHICLE INFORMATION, RECORDING MEDIUM STORING A PROGRAM, TRAFFIC SYSTEM, INFRASTRUCTURE SYSTEM, AND METHOD OF PROCESSING INFRASTRUCTURE INFORMATION

(71) Applicant: Panasonic Intellectual Property Corporation of America, Torrance, CA (US)

(72) Inventors: Ryota Ohnishi, Hyogo (JP); Takahiro Yoneda, Osaka (JP); Kazunobu Konishi, Osaka (JP); Yuta Shimotsuma, Osaka (JP); Akira Ishikawa, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/974,954

(22) Filed: May 9, 2018

(65) Prior Publication Data
US 2018/0336787 A1 Nov. 22, 2018

(30) Foreign Application Priority Data

May 18, 2017 (JP) .................. 2017-098734
May 18, 2017 (JP) .................. 2017-099121
Jan. 17, 2018 (JP) .................. 2018-005894

(51) Int. Cl.
*G08G 1/16* (2006.01)
*G05D 1/02* (2006.01)

(52) U.S. Cl.
CPC .......... *G08G 1/167* (2013.01); *G05D 1/0219* (2013.01); *G08G 1/166* (2013.01); *B60R 2300/802* (2013.01)

(58) Field of Classification Search
None
See application file for complete search history.

(56) References Cited

U.S. PATENT DOCUMENTS

2011/0102195 A1 5/2011 Kushi et al.
2015/0269843 A1* 9/2015 Ichinokawa .......... G08G 1/167
                                                340/435
2017/0276780 A1* 9/2017 Takehara ............... G01S 13/91

FOREIGN PATENT DOCUMENTS

JP          2005-011252        1/2005

OTHER PUBLICATIONS

The Extended European Search Report dated Oct. 18, 2018 for the related European Patent Application No. 18172013.7.

* cited by examiner

*Primary Examiner* — John F Mortell
(74) *Attorney, Agent, or Firm* — Greenblum & Bernstein P.L.C.

(57) ABSTRACT

A vehicle system includes an obtainment unit that obtains first blind spot information from an infrastructure system having an infrastructure sensor detecting a surrounding object, the first blind spot information indicating a blind spot region due to the object observed from the infrastructure sensor, and a detection recognizer that generates second blind spot information indicating a blind spot region due to the object observed from an in-vehicle sensor detecting the object. The detection recognizer has a combination unit that outputs common blind spot information indicating a first common blind spot region common to the blind spot regions (Continued)

based on the first blind spot information and the second blind spot information to an external device.

15 Claims, 18 Drawing Sheets

FIG. 5

| DA01 | DATA ID | DA02 | TIME STAMP |
|---|---|---|---|
| DA03 | INFORMATION ON COORDINATE SYSTEM | | |
| DA04 | FIRST OBJECT INFORMATION | | |
| | ⋮ | | |
| | FIRST OBJECT INFORMATION | | |
| DA05 | FIRST BLIND SPOT INFORMATION | | |
| | ⋮ | | |
| | FIRST BLIND SPOT INFORMATION | | |

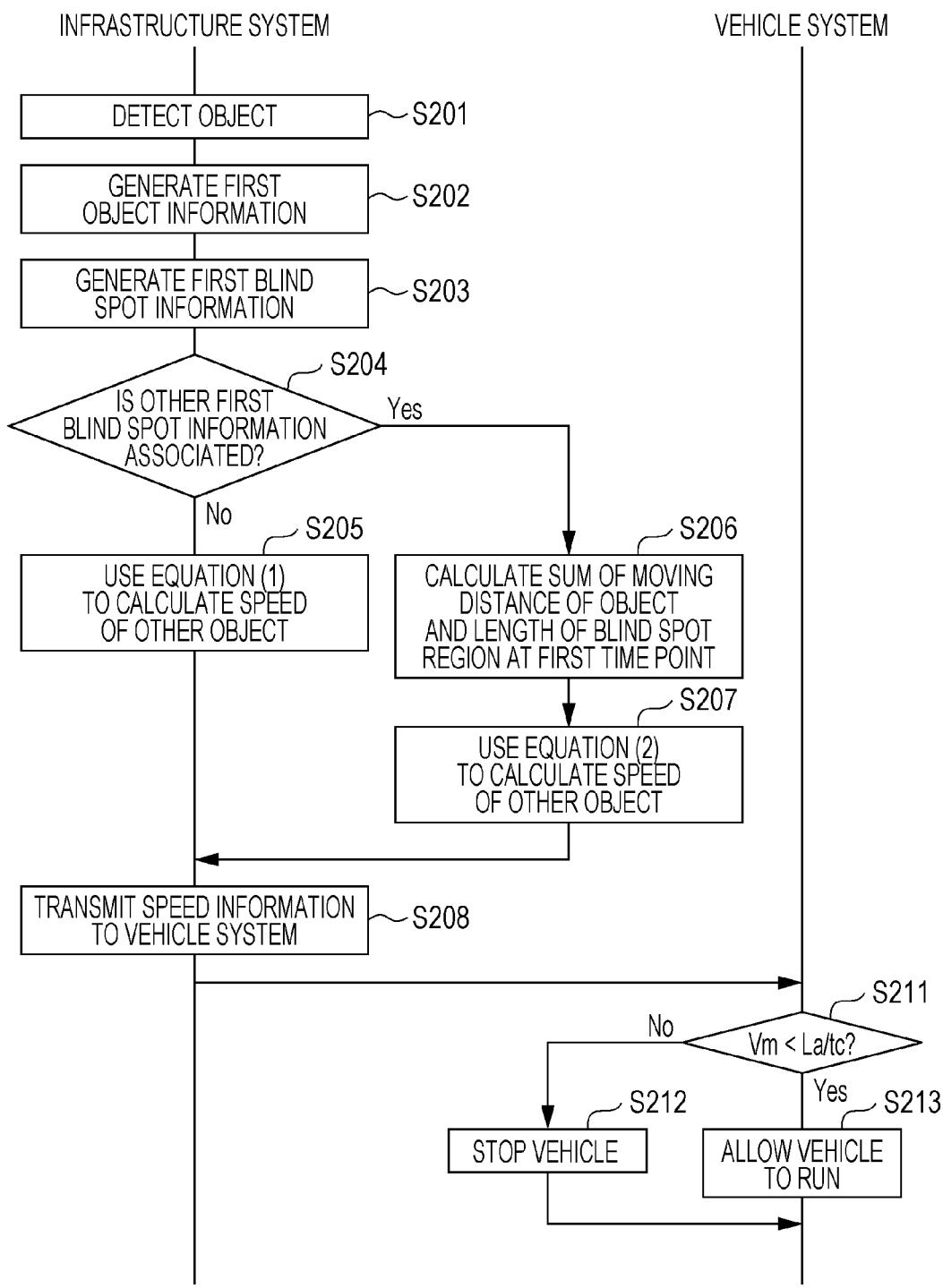

VEHICLE SYSTEM, METHOD OF PROCESSING VEHICLE INFORMATION, RECORDING MEDIUM STORING A PROGRAM, TRAFFIC SYSTEM, INFRASTRUCTURE SYSTEM, AND METHOD OF PROCESSING INFRASTRUCTURE INFORMATION

BACKGROUND

1. Technical Field

The present disclosure relates to a vehicle system, a method of processing vehicle information, a recording medium storing a program, a traffic system, an infrastructure system, and a method of processing infrastructure information.

2. Description of the Related Art

In recent years, a vehicle information provision device has been known which warns a driver by using information on other vehicles indicating location, vehicle speed, vehicle type, and so on detected by a vehicle detection sensor (e.g., see Japanese Patent No. 4247710). A vehicle information provision device of Japanese Patent No. 4247710 includes a front detection sensor that detects an obstacle that hinders the driver from visually recognizing an oncoming vehicle, and an alert notification unit that, when the obstacle is detected, causes a display unit to display a blind spot region unobservable by the driver due to the obstacle and/or an observable region with no hindrance on a display screen in a superimposed manner.

This vehicle information provision device obtains information on the obstacle detected by an infrastructure sensor and also obtains information on the obstacle detected by the front detection sensor. The vehicle information provision device presents the obstacle information through the alert notification unit.

SUMMARY

However, in Japanese Patent No. 4247710, consideration is made on a blind spot from the front detection sensor of the vehicle information provision device in detecting a road situation, but no consideration is made on a blind spot from the infrastructure sensor in detecting a road situation. Thus, if there is a blind spot common to the front detection sensor and the infrastructure sensor, this vehicle information provision device cannot recognize the presence of this common blind spot. As a result, even if an obstacle that may hinder the vehicle from traveling is present in this common blind spot, the vehicle information provision device cannot recognize any of the obstacle and the common blind spot, and thus the vehicle may collide with the obstacle when running.

One non-limiting and exemplary embodiment provides a vehicle system, a method of processing vehicle information, a recording medium storing a program, a traffic system, an infrastructure system, and a method of processing infrastructure information that allow a vehicle runs safely, and the present disclosure is made to solve the above problems.

In one general aspect, the techniques disclosed here feature a vehicle system including: processing circuitry; and first storage including at least one set of instructions, when executed by the processing circuitry, cause the processing circuitry to perform operations including: obtaining first blind spot information from an infrastructure system having an infrastructure sensor detecting a surrounding object, the first blind spot information indicating a blind spot region due to the object observed from the infrastructure sensor; generating second blind spot information indicating a blind spot region due to the object observed from an in-vehicle sensor detecting the object; and outputting common blind spot information indicating a first common blind spot region common to the blind spot regions based on the first blind spot information and the second blind spot information to an external device.

According to a vehicle system, a method of processing vehicle information, a recording medium storing a program, a traffic system, an infrastructure system, and a method of processing infrastructure information of the present disclosure, a vehicle can run safely.

It should be noted that general or specific embodiments may be implemented as a system, an apparatus, a method, a storage medium, a computer program, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram illustrating an example of a data format for transmission from an infrastructure system to a vehicle system;

FIG. 16 is a sequence diagram illustrating operations of a vehicle system according to Embodiment 2;

DETAILED DESCRIPTION

Figure 1:
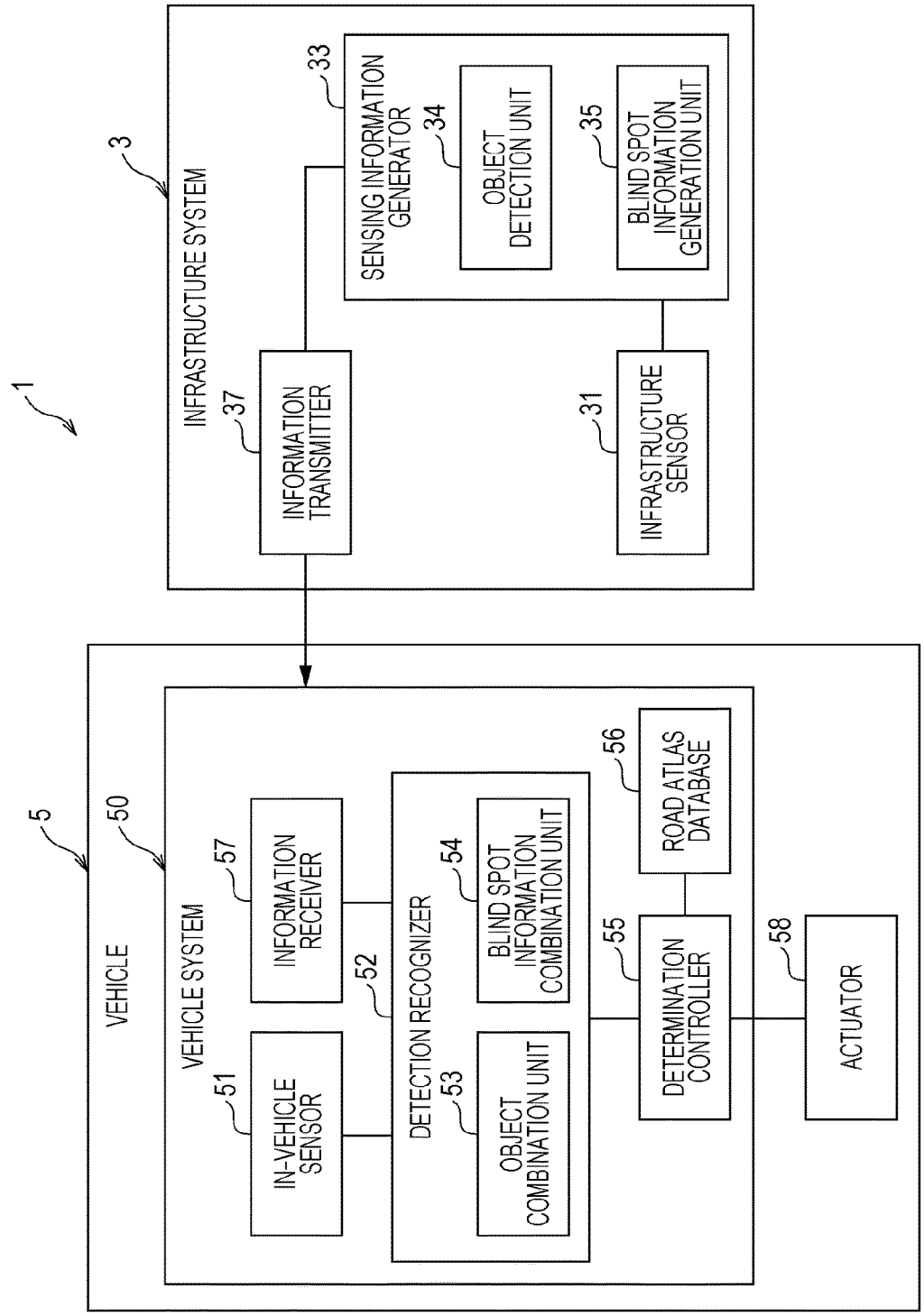
FIG. 1 is a block diagram illustrating an example of a configuration of a traffic system according to Embodiment 1.

A vehicle system of the present disclosure includes: processing circuitry; and first storage including at least one set of instructions, when executed by the processing circuitry, cause the processing circuitry to perform operations including: obtaining first blind spot information from an infrastructure system having an infrastructure sensor detecting a surrounding object, the first blind spot information indicating a blind spot region due to the object observed from the infrastructure sensor; generating second blind spot information indicating a blind spot region due to the object observed from an in-vehicle sensor detecting the object; and outputting common blind spot information indicating a first common blind spot region common to the blind spot regions based on the first blind spot information and the second blind spot information to the external device.

In this way, the vehicle system obtains the first blind spot information on the blind spot, which occurs when the object is observed from the infrastructure sensor, from the object detected by the infrastructure sensor. The vehicle system generates second blind spot information on the blind spot for the in-vehicle sensor detecting the object. The vehicle system can recognize that there is the first common blind spot region that is a blind spot common in a case where the object is observed from the infrastructure sensor and a case where the object is observed from the in-vehicle sensor, by combining the blind spot regions based on the first blind spot information and the second blind spot information.

Thus, using the first common blind spot region, this vehicle system can allow the vehicle to run safely.

A method of processing vehicle information of the present disclosure includes: obtaining first blind spot information from an infrastructure system having an infrastructure sensor detecting a surrounding object, the first blind spot information indicating a blind spot region due to the object observed from the infrastructure sensor; generating second blind spot information indicating a blind spot region due to the object observed from an in-vehicle sensor detecting the object; and outputting common blind spot information indicating a first common blind spot region common to the blind spot regions based on the first blind spot information and the second blind spot information to the external device.

A program stored in non-transitory computer-readable recording medium of the present disclosure, when executed in a computer, causes the computer to execute operations including: obtaining first blind spot information from an infrastructure system having an infrastructure sensor detecting a surrounding object, the first blind spot information indicating a blind spot region due to the object observed from the infrastructure sensor; generating second blind spot information indicating a blind spot region due to the object observed from an in-vehicle sensor detecting the object; and outputting common blind spot information indicating a first common blind spot region common to the blind spot regions based on the first blind spot information and the second blind spot information to an external device.

A traffic system of the present disclosure includes: an infrastructure system; and a vehicle system, wherein the infrastructure system includes an infrastructure sensor that detects a surrounding object, and first processing circuitry that, in operation, performs first operations including outputting first blind spot information to a vehicle, the first blind spot information indicating a blind spot region due to the object observed from the infrastructure sensor, and the vehicle system includes an in-vehicle sensor that detects the object, and second processing circuitry that, in operation, performs second operations including generating second blind spot information indicating a blind spot region due to the object observed from the in-vehicle sensor, and outputting common blind spot information indicating a first common blind spot region common to the blind spot regions based on the first blind spot information and the second blind spot information to the external device.

In the vehicle system of the present disclosure, the first operations further include calculating a speed of another object presumed to be in the blind spot region due to the object, in accordance with a predetermined period for which the infrastructure sensor performs detection, and a length of the blind spot region in a depth direction in which the object is observed from the infrastructure sensor, and outputting speed information indicating the speed to the vehicle.

Also in the above cases, the same operations and effects as the above are attained.

In the vehicle system of the present disclosure, the operations further include controlling running of a vehicle in accordance with the common blind spot information.

In this way, the vehicle system can control the running of the vehicle based on the common blind spot information. For example, the vehicle system can stop the vehicle from running when there is the first common blind spot region, and can allow the vehicle to run when there is no first common blind spot region.

In the vehicle system, the operations further include determining whether a size of the first common blind spot region is larger than a predetermined size, and allowing the vehicle to run when the size of the first common blind spot region is equal to or smaller than the predetermined size, and stopping the vehicle from running when the size of the first common blind spot region is larger than the predetermined size.

In this way, when the size of the first common blind spot region is equal to or smaller than the predetermined region, the vehicle system can determine that no other object is present within the first common blind spot region. Thus, if the predetermined size as the minimum size of the other object to be detected is determined in advance, the predetermined size is set as a threshold, and a small blind spot region can be thus ignored. In this case, the vehicle system can determine to allow the vehicle to run.

When the size of the first common blind spot region is larger than the predetermined size, the vehicle system can determine that there is the other object present within the first common blind spot region. That is, because there is the possibility that the other object is present within the first common blind spot region, the vehicle system can determine to stop the vehicle from running.

Thus, this vehicle system can increase the chance of determining to allow the vehicle to run, and decrease of the safety during the running of the vehicle, such as occurrence of collision between the vehicle and an object, is hardly occurred. As a result, this vehicle system enhances the running efficiency of the vehicle.

In the vehicle system of the present disclosure, the operations further include extracting an attention region for controlling the vehicle in accordance with at least a running direction and a speed of the object, and stopping the vehicle from running when a second common blind spot region common to the blind spot region due to the object and the attention region occurs in a case of being observed from the in-vehicle sensor.

In this way, the vehicle system extracts the attention region based on the running direction and the speed of the object, and stops the vehicle from running when there is the object in the attention region. Thus, even when there is the other object in the blind spot region behind the object observed from the vehicle, the collision between the vehicle and the other object can be avoided. Hence, the vehicle can run safely.

The vehicle system of the present disclosure further includes a second storage that stores road atlas information for enabling the vehicle to run, in which the operations further include at least superimposing the first blind spot information and the second blind spot information onto the road atlas information.

In this way, since the first and second blind spot information are superimposed onto the road atlas information, the first common blind spot region can be mapped on the road atlas information. Thus, the vehicle system can control the running of the vehicle based on the road atlas information indicating the first common blind spot region.

In the vehicle system of the present disclosure, the operations further include estimating a predicted trajectory from when the vehicle starts a predetermined running to when the vehicle finishes the predetermined running, and determining whether an estimated arrival-predicted period until another object reaches the predicted trajectory is longer than an estimated passage period until the vehicle finishes passing the predicted trajectory, and allowing the vehicle to run when the arrival-predicted period is longer than the passage period, and stopping the vehicle from running when the arrival-predicted period is equal to or shorter than the passage period.

Thus, since the moving speed of the object is slow when the arrival-predicted period is longer than the passage period, it can be estimated that the possibility of collision between the vehicle and the object is low. Since the moving speed of the object is fast when the arrival-predicted period is equal to or shorter than the passage period, it can be estimated that there is the possibility of collision between the vehicle and a second oncoming vehicle. Thus, the vehicle system performs control to allow the vehicle to run when the arrival-predicted period is longer than the passage period, and to stop the vehicle from running when the arrival-predicted period is equal to or shorter than the passage period. Hence, this vehicle system allows the vehicle to run more safely.

In the vehicle system of the present disclosure, the operations further include obtaining first object information on the object observed from the infrastructure sensor, outputting second object information on the object observed from the in-vehicle sensor, and combining the first object information and the second object information.

In this way, since the first object information and the second object information are combined, the information such as location and speed of the object can be accurately detected. Thus, the location and speed and the like of the object can be checked.

An infrastructure system of the present disclosure that communicates with a vehicle system includes: an infrastructure sensor that detects a surrounding object; and processing circuitry that, in operation, performs operations including extracting a blind spot region behind the object detected by the infrastructure sensor, calculating a speed of another object presumed to be in the blind spot region due to the object, in accordance with a predetermined period for which the infrastructure sensor performs detection, and a length of the blind spot region in a depth direction in a case where the object is observed from the infrastructure sensor, and outputting speed information indicating the speed to a vehicle.

In this way, based on the predetermined period, at intervals of which the infrastructure sensor performs detection, and the length of the blind spot region in the depth direction in a case where the object is observed from the infrastructure sensor, the infrastructure system calculates the speed of the other object presumed to be in the blind spot region and outputs the speed information indicating the speed to the vehicle. Thus, the vehicle that obtains the speed information can determine whether to allow running, stopping, or the like of the vehicle based on the speed information.

A method of processing infrastructure information of the present disclosure includes: causing an infrastructure sensor to detect a surrounding object; extracting a blind spot region due to the object detected by the infrastructure sensor; calculating a speed of another object presumed to be in the blind spot region due to the object, in accordance with a predetermined period for which the infrastructure sensor performs detection, and a length of the blind spot region in a depth direction in a case where the object is observed from the infrastructure sensor; and outputting speed information indicating the speed to a vehicle.

Also in this case, the same operations and effects as the above are attained.

In the infrastructure system of the present disclosure, the predetermined period is a detection period in which the object at between a first time point and a second time point at each of which the object is detected, and the length of the blind spot region is a sum of a distance moved by the object during the detection period and a length of the blind spot region at the first time point.

In this way, the infrastructure system can estimate the speed of the other object present within the blind spot region behind the object from the sum of the distance moved by the object during the detection period and the length of the blind spot region in the depth direction at the first time point. Thus, if the infrastructure system outputs the speed information indicating the speed to the vehicle, the vehicle can run, stop, or do the like based on the speed information.

In the infrastructure system of the present disclosure, the predetermined period is a sampling cycle in which the infrastructure sensor performs detection periodically.

In this way, the infrastructure system can estimate the speed of the other object present within the blind spot region behind the object detected by the infrastructure system in every sampling cycle. Thus, if the infrastructure system outputs the speed information indicating the speed to the vehicle, the vehicle can run, stop, or do the like based on the speed information.

Any of the embodiments described below illustrates comprehensive or specific examples. Numerical values, shapes, constituents, arrangement position and connection form of constituents, steps, order of steps, and the like mentioned in the following embodiments are examples and are not aimed to limit the present disclosure. Among the constituents in the following embodiments, any one not stated in an independent claim specifying the broadest concept is described as an optional constituent.

Each of the drawings is schematic and is not necessarily illustrated precisely. In the drawings, substantially the same configurations are denoted by the same reference numerals to omit or simplify redundant descriptions.

Hereinafter, a vehicle system, a method of processing vehicle information, a recording medium storing a program, a traffic system, an infrastructure system, and a method of processing infrastructure information are described.

(Embodiment 1)

FIG. 1 is a block diagram illustrating an example of a configuration of a traffic system 1 according to Embodiment 1.

As illustrated in FIG. 1, the traffic system 1 is a system that calculates a common blind spot region from an object detected by a vehicle system 50 and an infrastructure system 3 and controls a vehicle 5 based on that blind spot region. The vehicle 5 instrumented with the vehicle system 50 in this embodiment is assumed to be an automated driving vehicle in which the vehicle system 50 controls running, stopping, and the like of the vehicle 5.

The traffic system 1 comprises the infrastructure system 3 and the vehicle system 50.

The infrastructure system 3 is a system that detects a surrounding object and transmits the detected information to the vehicle system 50. For example, in order to detect the object such as a vehicle and a person on a road, the infrastructure system 3 is installed on a place such as a roadside that allows the infrastructure system 3 to detect a predetermined region.

The infrastructure system 3 has an infrastructure sensor 31, a sensing information generator 33, and an information transmitter 37.

The infrastructure sensor 31 is a sensor that can detect the surrounding object, and for example, the infrastructure sensor 31 detects a state of the object on the road. Specifically, the infrastructure sensor 31 generates first detection information such as location, size, and speed of an object present within a detectable detection target area, for example. The infrastructure sensor 31 is a laser range finder (LRF), a light detection and ranging or laser imaging detection and ranging (LIDAR) sensor, a camera, a millimeter-wave radar, and the like, for example. The infrastructure sensor 31 outputs the generated first detection information on the object to the sensing information generator 33.

Figure 2:
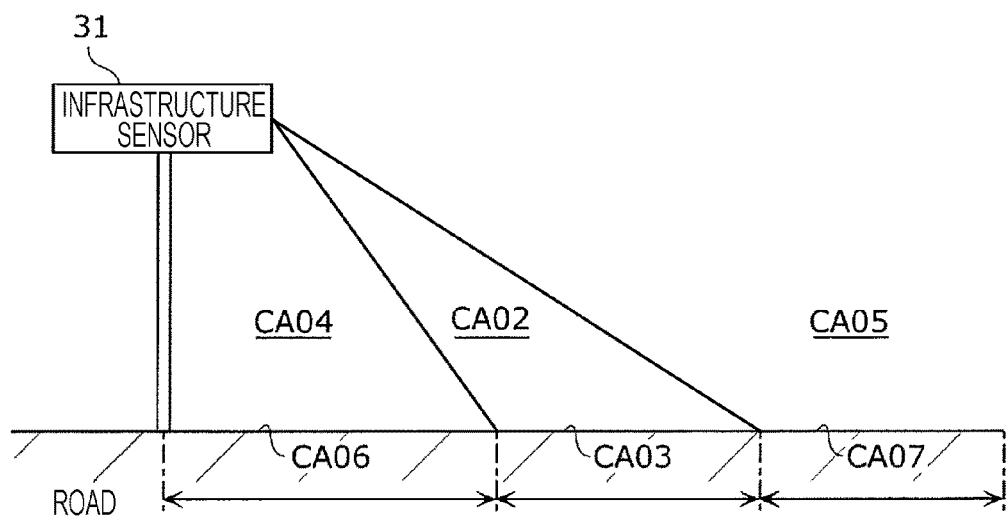
FIG. 2 is a schematic diagram of a detection target area of an infrastructure sensor installed on a road and the like in a horizontal view.
Figure 3:
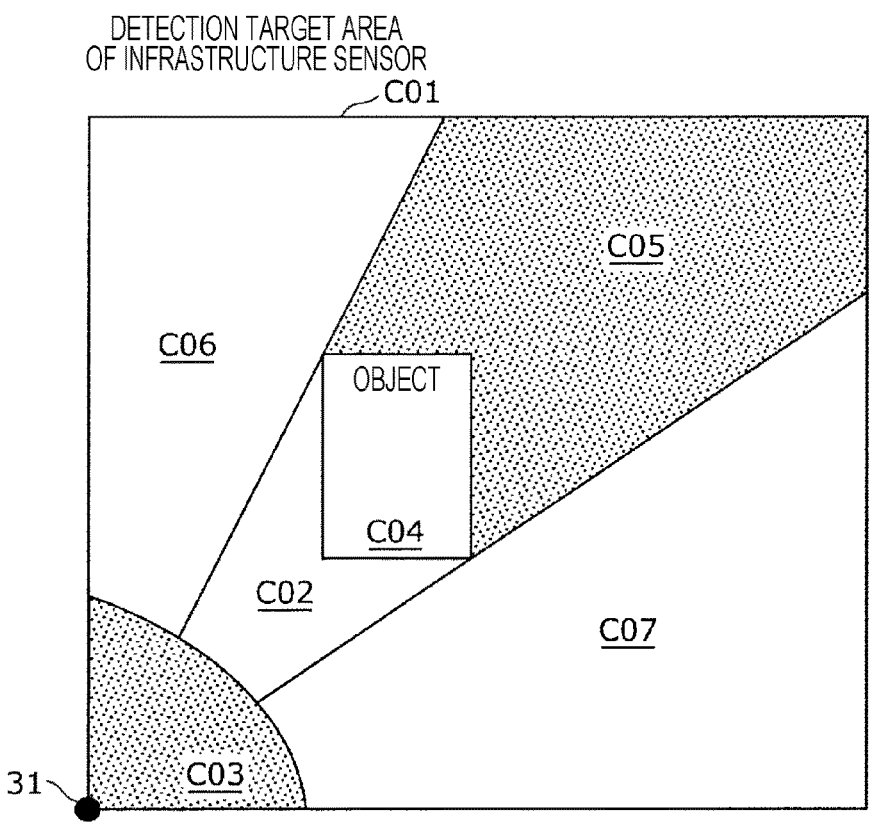
FIG. 3 is a schematic diagram of the infrastructure sensor, the detection target area of the infrastructure sensor, and an object present within the detection target area in a plane view from above.

The detection target area of the infrastructure sensor 31 is described using FIGS. 2 and 3.

FIG. 2 is a schematic diagram of the detection target area of the infrastructure sensor 31 installed on the road and the like in a horizontal view. FIG. 3 is a schematic diagram of the infrastructure sensor 31, the detection target area, and an object present within the detection target area in a plane view from above.

A blind spot region, which is a blind spot for the infrastructure sensor 31 performing detection, can be generally categorized in two types.

Firstly, as illustrated in FIG. 2, the first type is a blind spot region resulting from a field of view (FOV) of the infrastructure sensor 31. The infrastructure sensor 31 is assumed to be installed on the road and the like, for example. The FOV of the infrastructure sensor 31 is changed depending on conditions of the installation. The FOV of the infrastructure sensor 31 is illustrated as a region CA02. In this case, assuming that the road is partitioned into a blind spot region and a detection region when the infrastructure sensor 31 detects the road, a region CA03 of the road as a destination of the region CA02 is also the FOV. Meanwhile, blind spot regions CA06 and CA07 as respective destinations of blind spot regions CA04 and CA05, outside the region CA02, are the blind spot regions. That is, the blind spot region resulting from the FOV of the infrastructure sensor 31 is uniquely determined depending on the conditions of the infrastructure sensor 31 installation.

Next, as illustrated in FIG. 3, the second type is a blind spot region C05 resulting from a shadow (occlusion) of an object C04, which occurs when the object C04 is present within a detection target region C01 of the infrastructure sensor 31. Unlike a blind spot region C03 resulting from the FOV of the infrastructure sensor 31, the location of the blind spot region C05 is changed according to the location of the object C04. In other words, if the location of the infrastructure sensor 31 detecting the object C04 is changed, the blind spot region C05 as a blind spot behind the object is also changed. The blind spot region C05 due to the object C04 is a partial region of the detection target area other than the blind spot region C03, the regions C06 and C07, the FOV C02, and the object C04.

Since there is only one object C04 present, the blind spot region C05 due to the occlusion is also a single region. However, when multiple objects are present within the detection target region C01 of the infrastructure sensor 31, size or number of the blind spot region C05 due to the occlusion is accordingly increased. When the object C04 moves, a part as the blind spot for the infrastructure sensor 31 is also changed according to the location of the object C04. Thus, the blind spot region C05 is also changed according to the location of the object C04.

In this way, the infrastructure sensor 31 extracts the blind spot region C03 resulting from the FOV C02 of the infrastructure sensor 31 detecting the object and the blind spot region C05 due to the occlusion. That is, in the given detection target region C01, the blind spot regions C03 and C05 are the regions that can be extracted from the first detection information that the infrastructure sensor 31 detected.

As illustrated in FIG. 1, from the first detection information obtained from the infrastructure sensor 31, the sensing information generator 33 generates first object information, which indicates the object, and first blind spot information, which indicates the blind spot region due to the object. The sensing information generator 33 is an example of an information generator.

Specifically, the sensing information generator 33 has an object detection unit 34 and a blind spot information generation unit 35.

The object detection unit 34 extracts the object present within the detection target area from the first detection information and generates the first object information such as size, shape, speed, and location of the object observed from the infrastructure sensor 31. The object detection unit 34 outputs the generated first object information to the blind spot information generation unit 35 and the information transmitter 37.

The blind spot information generation unit 35 extracts the blind spot region behind the object detected by the infrastructure sensor 31. The blind spot region generated by the blind spot information generation unit 35 is now specifically described.

Figure 4:
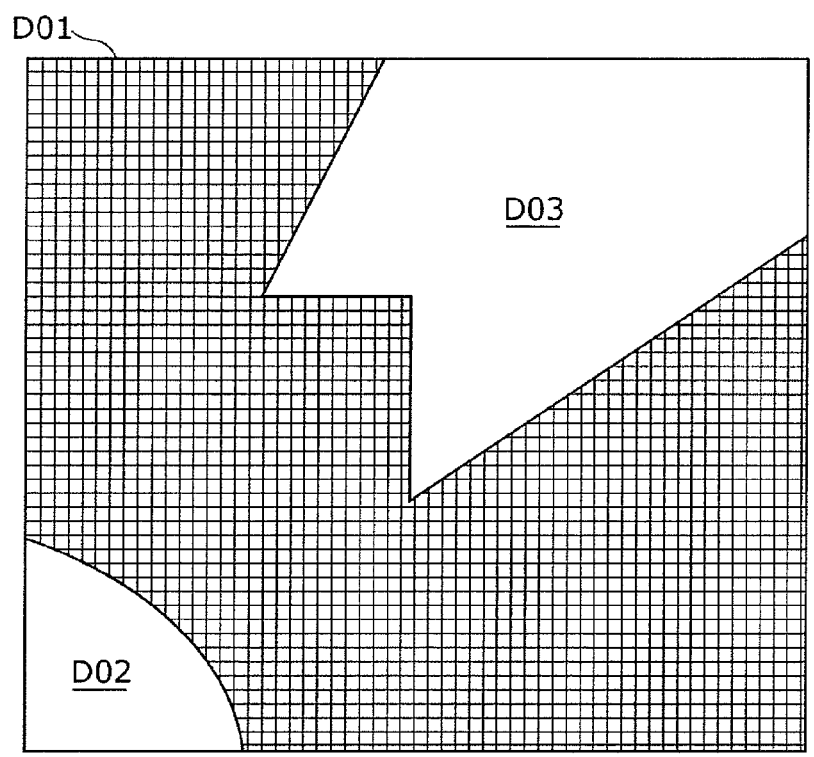
FIG. 4 is an explanative diagram in which only blind spot regions in FIG. 3 are extracted.

FIG. 4 is an explanatory diagram in which only the blind spot regions C03 and C05 in FIG. 3 are extracted. As illustrated in FIG. 4, a detection target area D01 of the infrastructure sensor 31 is illustrated using grid patterns. The detection target region C01 in FIG. 3 corresponds to a detection target area D01, the detection target region C03 in FIG. 3 corresponds to a region D02, and the detection target region C05 in FIG. 3 corresponds to a region D03.

From the first object information generated by the object detection unit 34, the blind spot information generation unit 35 calculates the blind spot region C05 due to the occlusion as illustrated in FIG. 3 and the blind spot region C03 resulting from the FOV C02, in a case of being observed from the infrastructure sensor 31. The blind spot information generation unit 35 superimposes the blind spot region C03 resulting from the FOV C02 and the blind spot region C05 resulting from the occlusion to extract the blind spot regions D02 and D03 in FIG. 4 for the object observed from the infrastructure sensor 31 as illustrated in FIG. 4. The blind spot information generation unit 35 then generates the first blind spot information such as locations, sizes, and speeds of the blind spot regions D02 and D03, and outputs the generated information to the information transmitter 37.

Whether there is a blind spot region within the detection target area D01 is determined by dividing inside the detection target area D01 into fine grid patterns to see if there is a part where each of the grid patterns overlaps with the blind spot region D02 or D03. The part where the grid pattern overlaps with the blind spot region D02 or D03 can be determined as a grid pattern corresponding to the blind spot region. On the other hand, a part where no grid pattern overlaps with the blind spot region D02 or D03 can be determined as a grid pattern that can be detected by the infrastructure sensor 31.

Using finer grid patterns, the original blind spot regions D02 and D03 can be reproduced more precisely; however, the data size becomes too large. Thus, the size of each grid pattern is better to be comparable with the size in a case where an object is observed from above. For instance, one side may be about 20 cm in a case of detecting a person. The size of the grid pattern may be either of 20 cm or more and 20 cm or less.

The sensing information generator 33 transmits the first object information generated by the object detection unit 34 and the first blind spot information generated by the blind spot information generation unit 35 to the vehicle system 50 via the information transmitter 37.

The information transmitter 37 may convert the first object information and the first blind spot information into a form available for transmission before transmitting to the vehicle system 50. As an example of a media for the transmission from the information transmitter 37 to the vehicle system 50, either of radio waves of unlicensed bands such as 920 MHz band, 2.4 GHz band, and 5 GHz band, and radio waves of bands for a traffic safety support system such as 700 MHz and 5.9 GHz may be used. In addition, in order to deal with a data loss during wireless transmission, redundancy of the transmitted data may be improved using techniques such as data retransmission control and forward error correction (FEC). When the infrastructure system 3 transmits the first object information and the first blind spot information to the vehicle system 50, coordinate system information may be applied to allow the vehicle system 50 to interpret them. As an example of the coordinate system information, a general coordinate system such as Japan Plane Rectangular Coordinate System may be associated with the transmitted information, or an infrastructure sensor 31-centered coordinate system may be applied for the transmission.

FIG. 5 is a diagram illustrating an example of a data format for the transmission from the infrastructure system 3 to the vehicle system 50.

As illustrated in FIG. 5, the transmitted data has a field DA01 of a data ID capable of uniquely identifying data, a field DA02 of a time stamp indicating a time when the data is created, a field DA03 indicating information on the coordinate system, a field DA04 in which the first object information is written, and a field DA05 in which the first blind spot information is written. When creating a transmitted data packet, the information transmitter 37 may transmit divided transmitted data according to the maximum transfer unit (MTU) of a network for transmitting the data.

The vehicle system 50 is a system instrumented in the vehicle 5 that controls the vehicle 5 in accordance with the first blind spot information. The vehicle system 50 has an in-vehicle sensor 51, a detection recognizer 52, a determination controller 55, a road atlas database 56, and an information receiver 57.

The in-vehicle sensor 51 is a sensor that detects a surrounding situation, and for example, the in-vehicle sensor 51 detects an object around the vehicle 5 or in the running direction of the vehicle 5. Specifically, the in-vehicle sensor 51 generates second detection information such as location, size, and speed of the object present within the detectable detection target area, for example. The in-vehicle sensor 51 is an LRF, a camera, a LIDAR sensor, a millimeter-wave radar, and the like, for example. The in-vehicle sensor 51 outputs the generated second detection information on the object to the detection recognizer 52.

From the second detection information on the object obtained by the in-vehicle sensor 51, the detection recognizer 52 generates second object information such as size, shape, speed, and location of the object observed from the in-vehicle sensor 51, and second blind spot information indicating the blind spot region due to the object. The detection recognizer 52 receives the first object information and the first blind spot information from the infrastructure system 3 via the information receiver 57.

The detection recognizer 52 has an object combination unit 53 and a blind spot information combination unit 54.

Based on the second detection information obtained from the in-vehicle sensor 51, the object combination unit 53 detects the object present within the detection target area and generates the second object information such as location, size, and speed of the object detected by the in-vehicle sensor 51. The object combination unit 53 is an example of a combination unit.

The object combination unit 53 outputs object combined information, which is a combination of the second object information generated from the second detection information and the first object information obtained from the infrastructure system 3, to the determination controller 55. The determination controller 55 reads road atlas information of surroundings of the vehicle 5 from the road atlas database 56 storing road information and the like, generates object map information in which the object combined information is mapped onto the road atlas information, and outputs the generated object map information to the blind spot information combination unit 54. The object combination unit 53 may read the road atlas information of the surroundings of the vehicle 5 from the road atlas database 56, may generate the object map information, and may output the generated object map information to the blind spot information combination unit 54.

From the second object information generated by the object combination unit 53, the blind spot information combination unit 54 calculates the blind spot region due to the occlusion as illustrated in FIG. 3. The blind spot information combination unit 54 also calculates the blind spot region resulting from the FOV included in the second detection information from the in-vehicle sensor 51. The blind spot information combination unit 54 superimposes the blind spot region resulting from the occlusion and the blind spot region resulting from the FOV and extracts a blind spot region for the in-vehicle sensor 51. In this way, the blind spot information combination unit 54 generates the second blind spot information such as location and size of the blind spot region for the in-vehicle sensor 51. The blind spot information combination unit 54 is an example of a combination unit.

The blind spot information combination unit 54 outputs common blind spot information, which indicates a first common blind spot region common to the respective blind spot regions based on the first and second blind spot information, to the external device. Specifically, the blind spot information combination unit 54 extracts the first common blind spot region common to the blind spot region included in the second blind spot information generated from the second detection information and the blind spot region included in the first blind spot information obtained from the infrastructure system 3. The blind spot information combination unit 54 outputs the common blind spot information indicating the extracted first common blind spot region to the external device. The external device is the determination controller 55, the road atlas database 56, and the like, for example. Otherwise, the external device may be a display equipped in the vehicle 5, a drive controller for controlling drive of the vehicle 5, and the like.

The blind spot information combination unit 54 generates map information in which the common blind spot information indicating the first common blind spot region is further mapped onto the object map information. That is, the map information becomes road atlas information in which the first and second object information and the first and second blind spot information are superimposed on each other. Specifically, the map information is information in which the blind spot region indicated by the first blind spot information and the blind spot region indicated by the second blind spot information are mapped onto the road atlas indicated by the road atlas information. The blind spot information combination unit 54 outputs the map information to the determination controller 55. In the map information, the first and second blind spot information other than the common blind spot information are also mapped. Note that, at least the first blind spot information and the second blind spot information are superimposed on each other in the map information.

The determination controller 55 controls running of the vehicle 5 in accordance with the common blind spot information. Specifically, the determination controller 55 uses the map information provided from the detection recognizer 52 to determine whether it is safe for the vehicle 5 to run. The determination controller 55 allows the vehicle 5 to run when it is determined that it is safe, and performs some controls such as stopping the vehicle 5 from running when it is determined that there is any danger. For example, the determination controller 55 controls an actuator 58 including an engine, a brake, a steering, and the like of the vehicle 5.

The determination controller 55 takes account of an attention region for controlling the vehicle 5 based on at least the running direction and the speed of the object. When a second common blind spot region common to the blind spot region due to the object and the attention region occurs in a case of being observed from the in-vehicle sensor 51, the determination controller 55 stops the vehicle 5 from running. Based on the attention region, the determination controller 55 determines whether to allow the vehicle 5 to run or to stop the vehicle 5 from running. This attention region is described using FIG. 6.

Figure 6:
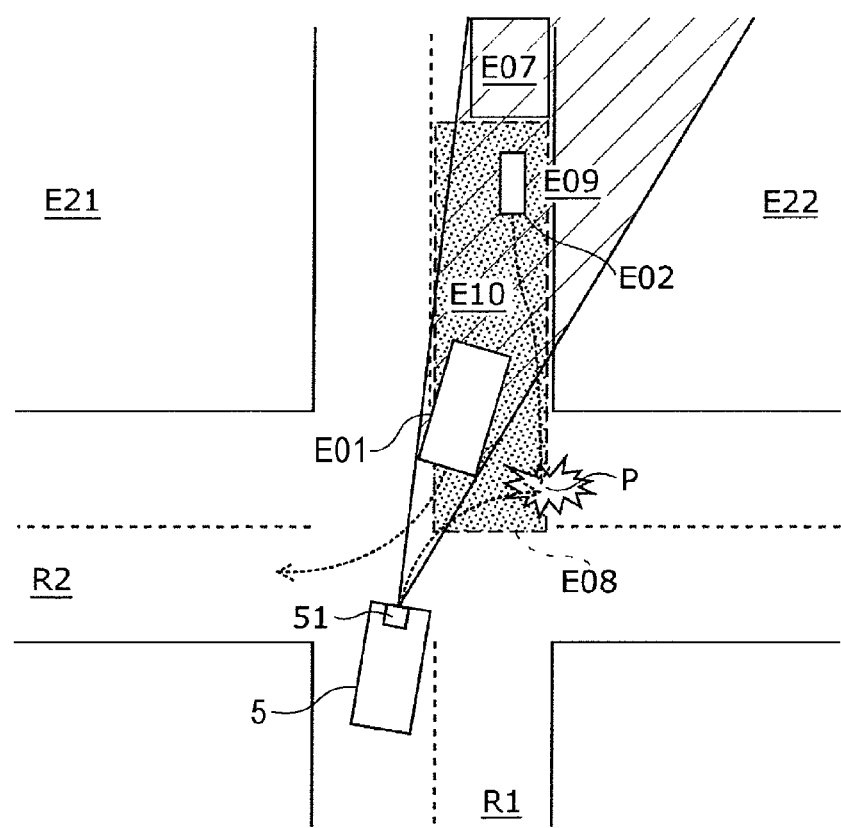
FIG. 6 is a diagram illustrating a typical example of an accident due to a blind spot while a vehicle is running.

FIG. 6 is a diagram illustrating a typical example of an accident due to a blind spot while the vehicle 5 is running. FIG. 6 exemplifies a situation just before the vehicle 5, which is turning right at an intersection, has a right-straight accident of collision with a second oncoming vehicle E02 running out from behind a first oncoming vehicle E01 at a point P. The right turn illustrated in FIG. 6 is an example, and the case is not limited to right turn and may be left turn, U-turn, circling, and the like. The first oncoming vehicle E01 is an example of the object. The second oncoming vehicle E02 is an example of another object.

FIG. 6 illustrates a crossroad including a vertical first road R1 and a horizontal second road R2 crossing the first road R1. The vehicle 5 moving in the upward direction is waiting at the intersection of the first road R1 and the second road R2 in order to turn right at the intersection. Meanwhile, on the opposite side of the vehicle 5, the first oncoming vehicle E01 moving in the downward direction is waiting at the intersection in order to turn right at the intersection. In such a situation, when the in-vehicle sensor 51 of the vehicle 5 detects information of surrounding objects E03, E21, E22, and the like, a region hidden behind the first oncoming vehicle E01 as one of the surrounding objects becomes a blind spot region E09 indicated with hatched lines. Even though there is the second oncoming vehicle E02 in this blind spot region E09, the in-vehicle sensor 51 of the vehicle 5 cannot recognize the second oncoming vehicle E02. Thus, if the vehicle 5 takes no account of the blind spot behind the first oncoming vehicle E01 and just keeps running, the vehicle 5 may be at risk of collision with the second oncoming vehicle E02 at the point P.

Thus, in a case where there is a first common blind spot region E10 common to a predetermined region E08 and a blind spot region E09 while the vehicle 5 is turning right at the intersection, if it is assumed that the second oncoming vehicle E02 is present in the first common blind spot region E10, it can be considered that the vehicle 5 may collide with the second oncoming vehicle E02. In this case, since the second oncoming vehicle E02 is close to the vehicle 5 at the intersection, the vehicle 5 turning right may collide with the second oncoming vehicle E02 coming straight. Note that the predetermined region E08 indicated with hatched dots and dashed line is an optional region that extends from an intersection point of a trajectory of the vehicle 5 turning right and a trajectory of the second oncoming vehicle E02 running straight to a side from which the second oncoming vehicle E02 comes.

There may be a case where there is a third oncoming vehicle E07 within the blind spot region E09 far from the first oncoming vehicle E01. The third oncoming vehicle E07 is located outside the predetermined region E08. In this case, since the third oncoming vehicle E07 is far from the vehicle 5, it takes time to reach the intersection even though the third oncoming vehicle E07 comes straight, and thus the possibility of collision between the vehicle 5 and the third oncoming vehicle E07 is low. The third oncoming vehicle E07 is an example of the other object.

In this point of view, a region that has to be actually concerned when the vehicle 5 turns right is the predetermined region E08, which is the blind spot region E09 without the third oncoming vehicle E07. That is, this predetermined region E08 is the attention region.

As illustrated in FIG. 1, the attention region may be stored as region information in the road atlas database 56 of the vehicle system 50 in advance. The determination controller 55 may call the attention region as necessary, and based on the information about lanes and the like included in the road atlas database 56, the determination controller 55 may automatically map the attention region onto a map indicated in the object map information or a map indicated in the map information.

In this way, the right-straight accident can be avoided if the vehicle 5 sequentially creates the attention region according to the running plan and turns right after confirming that there is no object within the attention region that the vehicle 5 may collide with.

The determination controller 55 determines whether to allow the vehicle 5 to run or to stop the vehicle 5 from running based on a period until the second oncoming vehicle E02 reaches the intersection.

Figure 7:
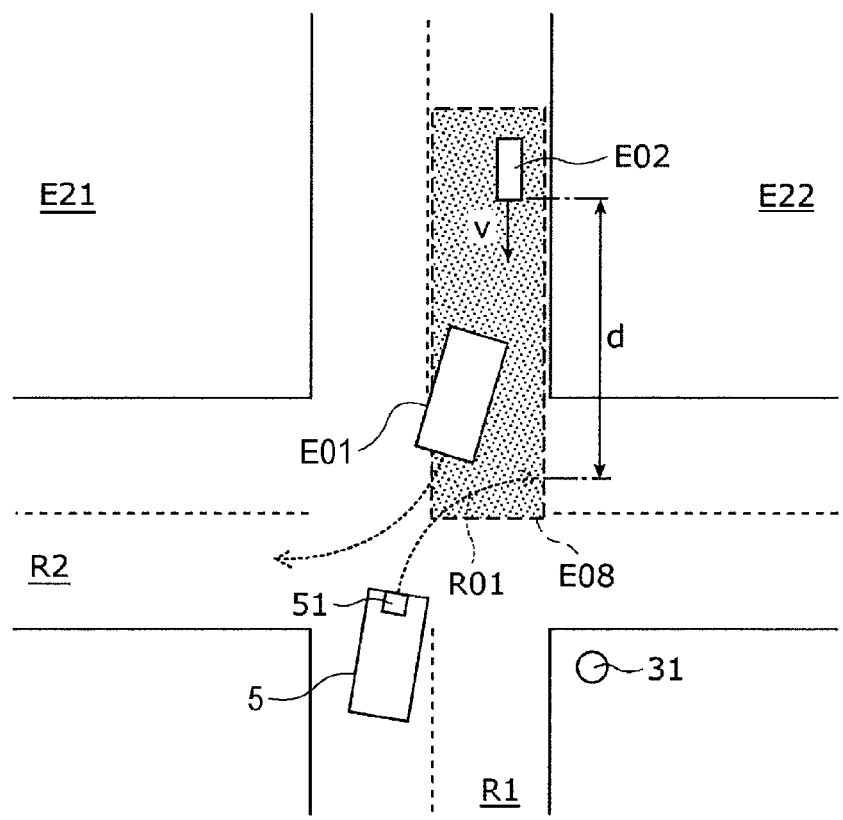
FIG. 7 is a schematic diagram illustrating a relationship between an object and a predicted trajectory of the vehicle.

FIG. 7 is a schematic diagram illustrating a relationship between an object and a predicted trajectory of the vehicle 5.

As illustrated in FIG. 7, the determination controller 55 estimates a predicted trajectory that the vehicle 5 passes while changing direction and calculates an estimated passage period until the vehicle 5 finishes passing the predicted trajectory. The predicted trajectory herein is a trajectory from where the vehicle 5 starts predetermined running to where the vehicle 5 finishes the predetermined running. For example, in a case of turning right, the predicted trajectory is a trajectory denoted by R01 on which it can be estimated that the vehicle 5 runs, from when the vehicle 5 starts turning right to when the vehicle 5 finishes the right turn. The change in direction herein has meanings including turn right, turn left, U-turn, circling, and the like.

Based on the second detection information from the in-vehicle sensor 51 or the first detection information from the infrastructure sensor 31, the determination controller 55 obtains a moving speed v of the second oncoming vehicle E02. In order to obtain the moving speed of the second oncoming vehicle E02, a value such as Doppler velocity that can be detected by the sensor side may be used, or a value obtained by the detection recognizer 52 that performs chronological tracking may be used, for example.

The determination controller 55 calculates an estimated arrival-predicted period until the second oncoming vehicle E02 reaches the predicted trajectory R01 of the vehicle 5. Specifically, assuming that a distance from a current location of the second oncoming vehicle E02 to the predicted trajectory R01 of the vehicle 5 is d, the estimated arrival-predicted period until the second oncoming vehicle E02 reaches the predicted trajectory R01 is Et, and the moving speed of the second oncoming vehicle E02 is v, the arrival-predicted period until the second oncoming vehicle E02 reaches the predicted trajectory R01 is calculated by Et=d/v. The distance d may be the maximum length in the depth direction of the attention region E08.

The determination controller 55 determines whether the estimated arrival-predicted period Et until the second oncoming vehicle E02 reaches the predicted trajectory is longer than an estimated passage period t until the vehicle 5 finishes passing the predicted trajectory.

If the period until the vehicle 5 finishes passing the predicted trajectory is short, the period until the second oncoming vehicle E02 reaches the predicted trajectory may be long; thus, it can be estimated that the possibility of collision between the vehicle 5 and the second oncoming vehicle E02 is low if the arrival-predicted period Et is longer than the passage period t. Hence, the determination controller 55 allows the vehicle 5 to run.

On the other hand, if the arrival-predicted period until the vehicle 5 finishes passing the predicted trajectory is long, the period until the second oncoming vehicle E02 reaches the predicted trajectory may be short; thus, it can be estimated that there is the possibility of collision between the vehicle 5 and the second oncoming vehicle E02 if the arrival-predicted period Et is equal to or shorter than the passage period t. Hence, the determination controller 55 stops the vehicle 5 from running.

The determination on whether the arrival-predicted period Et is longer than the passage period t is an example of determination on whether there is the possibility of collision between the vehicle 5 and the other object. For example, not only the simple determination on whether the arrival-predicted period Et is longer than the passage period t but also determination on whether a difference value between the arrival-predicted period Et and the passage period t is equal to or greater than a defined value may be made. In this case, for example, when a great value is set as the defined value, and the passage period t becomes sufficiently shorter than the arrival-predicted period Et, the determination controller 55 may estimate that the possibility of collision is low.

In addition, in FIG. 7, if the infrastructure sensor 31 detects the second oncoming vehicle E02, the vehicle 5 may obtain the information such as moving speed, size, and location of the second oncoming vehicle E02 from the infrastructure system 3. In this case, either of the infrastructure system 3 and the vehicle 5 may calculate the distance d.

Further, the determination controller 55 determines whether to allow the vehicle 5 to run or to stop the vehicle 5 from running based on the size of the first common blind spot region. That is, the determination controller 55 determines whether the first common blind spot region is larger than a predetermined size.

When the size of the first common blind spot region is equal to or smaller than the predetermined size, the determination controller 55 determines that there is no other object within the first common blind spot region and allows the vehicle 5 to run. On the other hand, when the size of the first common blind spot region is larger than the predetermined size, there may be the other object within the first common blind spot region; thus, the determination controller 55 determines that the other object is present within the first common blind spot region and stops the vehicle 5 from running.

In the calculation of the possibility of the collision between another object and the vehicle 5, it is necessary to approximately estimate whether the other object that may collide is a person or an automobile or estimate other things. Here, the size of another object assumed to collide is set in advance to be equal to or larger than that of a person. In this case, the predetermined size is naturally determined to be the minimum size of another object to be detected. For example, if a person viewed from above has a size of 40 cm square or larger, the predetermined size is 40 cm square, which is the minimum size of another object to be detected. In this vehicle system 50, the predetermined size is preferred to be as small as possible in order to allow the blind spot information to precisely reproduce the blind spot region. Thus, the predetermined size is not limited to be 40 cm square or larger.

When the first common blind spot region is equal to or smaller than the predetermined size, it can be considered that the first common blind spot region is a small region; thus, it can be estimated that no other object to be detected is present within the first common blind spot region.

The road atlas database 56 is a storage device that stores the road atlas information for enabling the vehicle 5 to run. The determination controller 55 may obtain the road atlas information such as Japan Plane Rectangular Coordinate from an external server via networks using an unillustrated communication unit. The road atlas information may include the attention region in advance. The road atlas database 56 is an example of a storage.

The information receiver 57 is a receiver device that obtains the first object information, the first blind spot information, and the like from the infrastructure system 3. The information receiver 57 is an example of an obtainment unit. The detection recognizer 52 may obtain the first object information, the first blind spot information, and the like from the infrastructure system 3. In this case, the detection recognizer 52 becomes an example of an obtainment unit.

[Operations]

Figure 8:
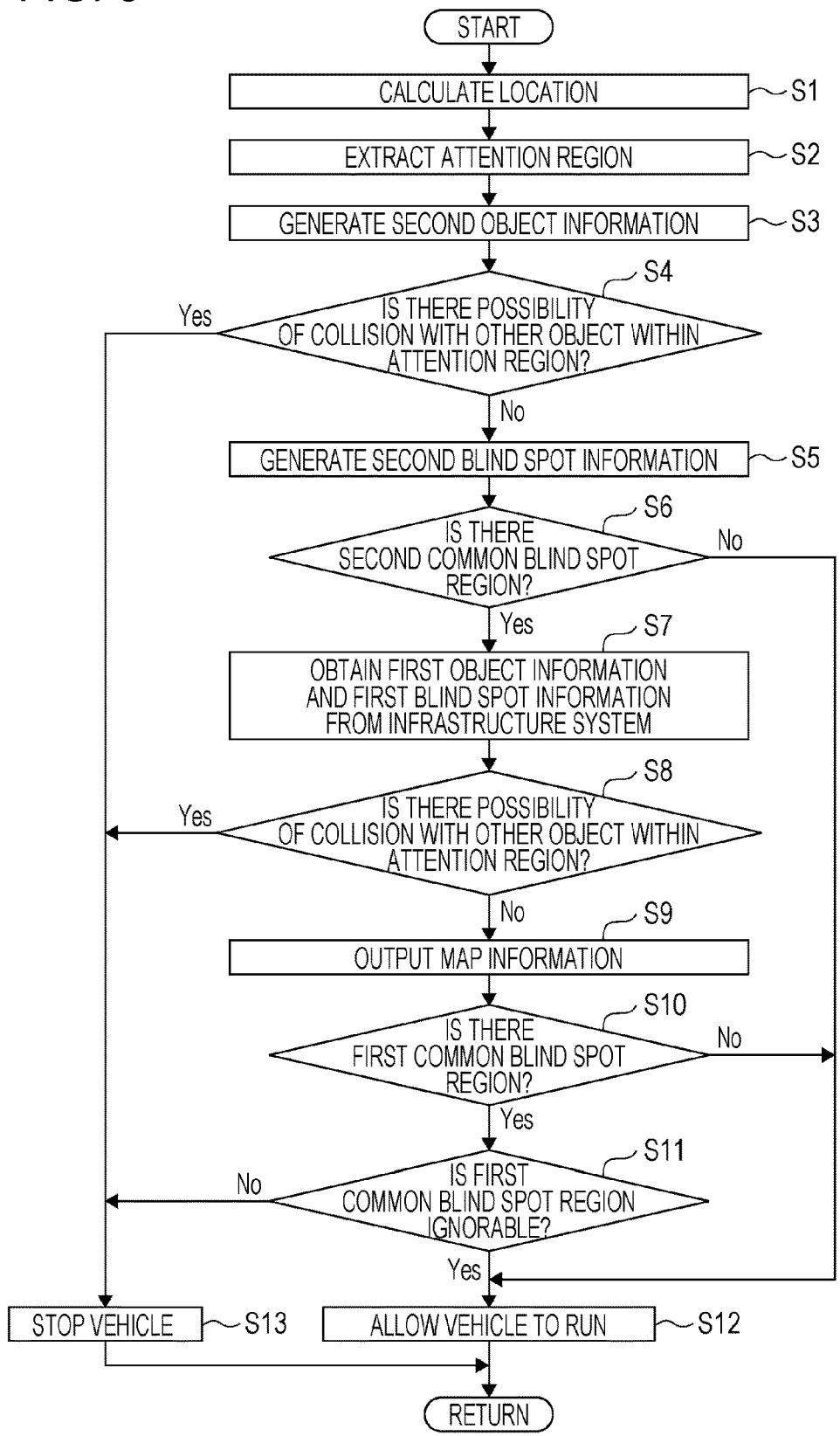
FIG. 8 is a flowchart illustrating operations of the vehicle system according to Embodiment 1.

Next, operations of the traffic system 1 is described using FIG. 8.

FIG. 8 is a flowchart illustrating operations of the vehicle system 50 according to Embodiment 1.

As illustrated in FIG. 8, firstly, the determination controller 55 calculates the location on the road atlas where the vehicle 5 is present currently (S1). In this case, the in-vehicle sensor 51 is used for calculating the location of the vehicle 5 on the road atlas. The location of the vehicle 5 on the road atlas may be calculated using a satellite positioning system such as the global navigation satellite system (GNSS), data obtained from an LRF, and the like, for example.

Next, the determination controller 55 extracts the attention region from the road atlas database 56 of the vehicle 5 (S2). This extraction of the attention region is performed on a region in which the vehicle 5 is running or going to run.

Next, the detection recognizer 52 uses the second detection information detected by the in-vehicle sensor 51 to perform detection processing on the object around the vehicle 5. Specifically, the object combination unit 53 of the detection recognizer 52 detects an object present within the detection target area and generates the second object information (S3).

Next, the determination controller 55 determines whether there is the possibility of collision with the other object, such as an oncoming vehicle other than the object, within the attention region extracted in step S2 (S4).

When it is determined that there is the possibility of collision with the other object (Yes in S4), the determination controller 55 transmits a control signal to the actuator 58 of the vehicle 5 to stop the vehicle 5 from running (S13). The determination controller 55 then returns to step S1 and performs the same procedures. A method of determining whether the other object is present is described later.

On the other hand, when it is determined that there is no possibility of collision with the other object (No in S4), the detection recognizer 52 generates the second blind spot information using the second object information calculated by the object combination unit 53 (S5). The case where there is no possibility of collision with the other object includes the case of low possibility of collision with the other object. It is similar for the later-described step S8.

Next, the determination controller 55 determines whether there is the second common blind spot region common to the blind spot region due to the object and the attention region (S6).

When it is determined that there is the second common blind spot region (Yes in S6), the determination controller 55 obtains the first object information and the first blind spot information obtained from the infrastructure system 3 (S7).

On the other hand, when it is determined that there is no second common blind spot region (No in S6), and there is no other object detected, the determination controller 55 transmits the control signal to the actuator 58 of the vehicle 5 and allows the vehicle 5 to run (S12). That is, it can be said that there is no blind spot within the attention region when there is no blind spot region common to the attention region and the blind spot region indicated by the second blind spot information. Thus, it can be considered that the risk of the collision between the running vehicle 5 and the other object is low, and if no other object is detected, the determination controller 55 allows the vehicle 5 to run (S12). The determination controller 55 then returns to step S1 and performs the same procedure.

Even when it is No in step S6, the determination controller 55 stops the vehicle 5 from running if the other object is detected, and once no other object is detected, the determination controller 55 allows the vehicle 5 to run.

Next, in accordance with the first object information and the first blind spot information obtained from the infrastructure system 3 in step S7, the determination controller 55 determines whether there is the possibility of collision with the other object within the attention region extracted in step S2 (S8). A method of determining whether the other object is present is described later.

When it is determined that there is the possibility of collision with the other object within the attention region (Yes in S8), the determination controller 55 transmits the control signal to the actuator 58 of the vehicle 5 and stops the vehicle 5 from running (S13). The determination controller 55 then returns to step S1 and performs the same procedure.

On the other hand, when the determination controller 55 determines that there is no possibility of collision with the other object within the attention region (No in S8), the detection recognizer 52 outputs the map information to the determination controller 55. Specifically, the object combination unit 53 outputs the object map information in which the second object information and the first object information are combined to the road atlas information, while the blind spot information combination unit 54 outputs the map information in which the second blind spot information and the first blind spot information are combined to the object map information (S9).

Next, based on the map information, the determination controller 55 determines whether there is the first common blind spot region common to the blind spot region indicated by the first blind spot information and the blind spot region indicated by the second blind spot information (S10).

When it is determined that there is the first common blind spot region (Yes in S10), the determination controller 55 determines whether the first common blind spot region is an ignorable blind spot region (S11). The determination on whether it is the ignorable blind spot region is described later.

On the other hand, when the determination controller 55 determines that there is no first common blind spot region (No in S10), it means that there is no blind spot common to the blind spot region for the infrastructure sensor 31 and the blind spot region for the in-vehicle sensor 51. When no other object is detected, the determination controller 55 thus transmits the control signal to the actuator 58 of the vehicle 5 and allows the vehicle 5 to run (S12).

Even when it is No in step S10, the determination controller 55 stops the vehicle 5 from running if the other object is detected, and once no other object is detected, the determination controller 55 allows the vehicle 5 to run.

When it is determined that the first common blind spot region is the ignorable blind spot region (Yes in S11), the determination controller 55 allows the vehicle 5 to run (S12). The determination controller 55 then returns to step S1 and performs the same procedure.

On the other hand, when it is determined that the first common blind spot region is an unignorable blind spot region (No in S11), the determination controller 55 stops the vehicle 5 from running (S13). The determination controller 55 then returns to step S1 and performs the same procedure.

Figure 9:
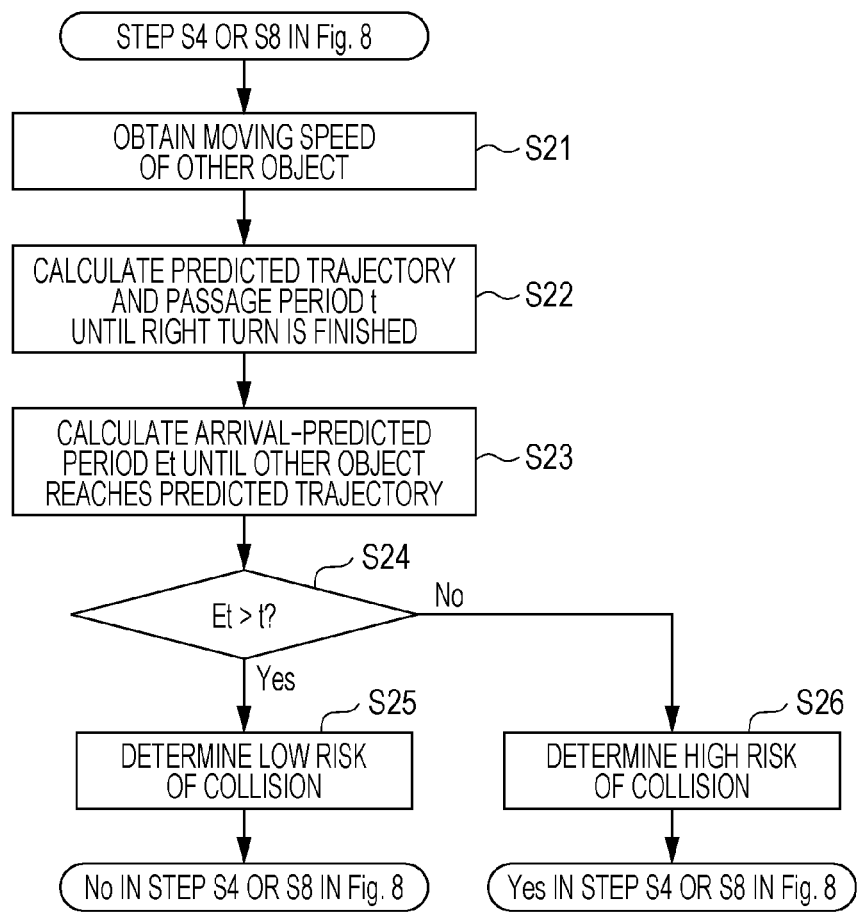
FIG. 9 is a flowchart illustrating determination in steps S4 and S8 in FIG. 8.

Next, determination on whether there is the possibility of collision between the other object and the vehicle 5 is described using FIGS. 8 and 9.

FIG. 9 is a flowchart illustrating determination in steps S4 and S8 in FIG. 8.

Firstly, the determination controller 55 obtains the moving speed of the other object (S21).

Next, the determination controller 55 calculates the predicted trajectory that the vehicle 5 passes when turning right and the passage period t in which the vehicle 5 passes that predicted trajectory and finishes the right turn (S22).

Next, the determination controller 55 calculates the arrival-predicted period Et in which the other object reaches the predicted trajectory of the vehicle 5 (S23).

Next, the determination controller 55 determines whether the arrival-predicted period Et is longer than the passage period t (S24).

When it is determined that the arrival-predicted period Et is longer than the passage period t (Yes in S24), it can be said that the possibility of collision between the vehicle 5 and the other object is low; thus, the determination controller 55 determines that the risk of collision between the vehicle 5 and the other object is low (S25). The determination controller 55 then determines as No in step S4 in FIG. 8 and proceeds to step S5; and determines as No in step S8 in FIG. 8 and proceeds to step S9.

On the other hand, when it is determined that the arrival-predicted period Et is equal to or shorter than the passage period t (No in S24), it can be said that there is the possibility of collision between the vehicle 5 and the other object; thus, the determination controller 55 determines that there is the risk of collision between the vehicle 5 and the other object (S26). The determination controller 55 then determines as Yes in step S4 in FIG. 8 and proceeds to step S13; and determines as Yes in step S8 in FIG. 8 and proceeds to step S13.

Figure 10:
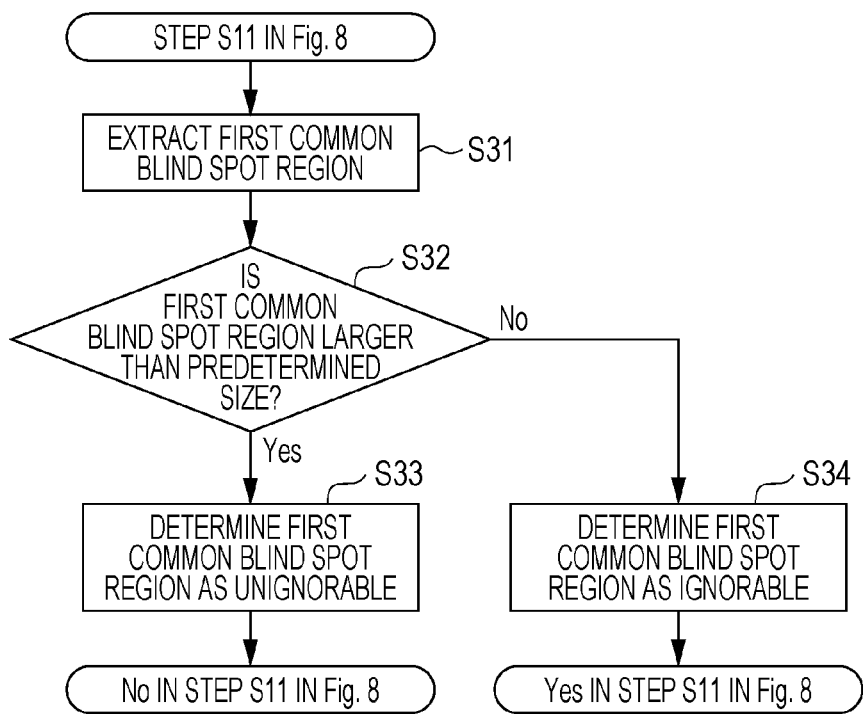
FIG. 10 is a flowchart illustrating determination in step S11 in FIG. 8.

Next, determination on whether the first common blind spot region is the ignorable blind spot region in step S11 in FIG. 8 is described using FIG. 10.

FIG. 10 is a flowchart illustrating determination in step S11 in FIG. 8.

As illustrated in FIG. 10, the determination controller 55 firstly extracts the first common blind spot region common to the blind spot region for the infrastructure sensor 31 and the blind spot region for the in-vehicle sensor 51, in step S11 in FIG. 8 (S31).

Next, the determination controller 55 determines whether the first common blind spot region is larger than the predetermined size (S32).

When it is determined that the first common blind spot region is larger than the predetermined size (Yes in S32), it can be said that there is the possibility that the other object is present within the first common blind spot region, and thus it is determined that the first common blind spot region is the unignorable blind spot region (S33). The determination controller 55 then determines as No in step S11 in FIG. 8 and proceeds to step S13.

On the other hand, when it is determined that the first common blind spot region is equal to or smaller than the predetermined size (No in S32), it can be said that there is no other object present within the first common blind spot region, and thus it is determined that the first common blind spot region is the ignorable blind spot region (S34). The determination controller 55 then determines as Yes in step S11 in FIG. 8 and proceeds to step S12.

Next, a procedure that allows the vehicle 5 to avoid the other object is described.

Figure 11:
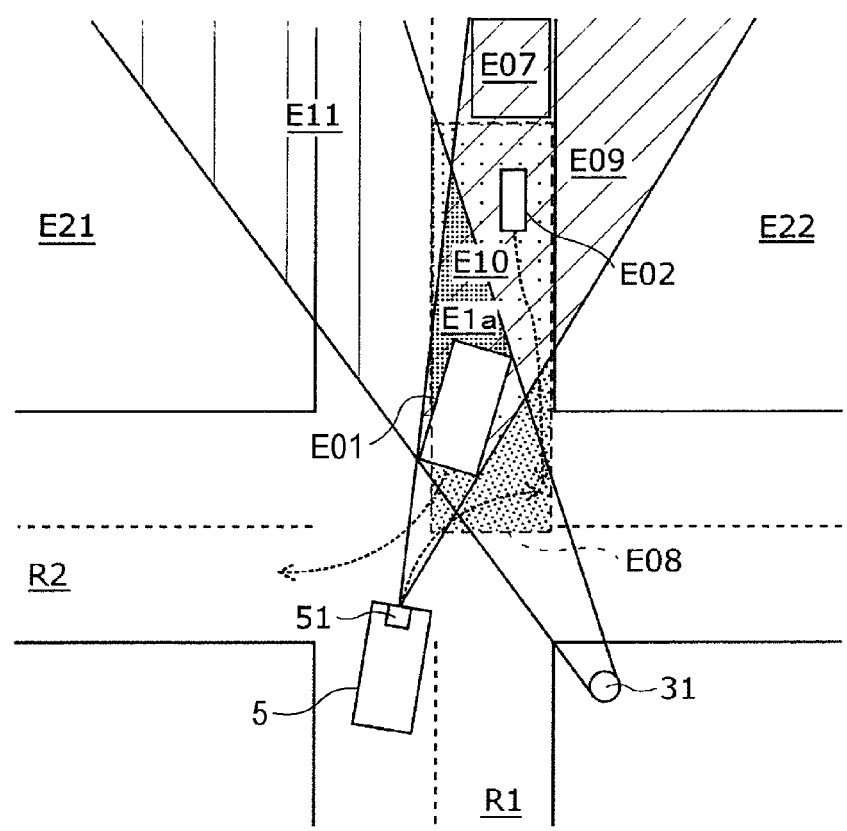
FIG. 11 is a schematic diagram illustrating blind spot regions, which occur when an object is observed from an in-vehicle sensor and the infrastructure sensor.

FIG. 11 is a schematic diagram illustrating blind spot regions, which occur when the object is observed from the in-vehicle sensor 51 and the infrastructure sensor 31.

As illustrated in FIG. 11, in the case where the vehicle 5 and the first oncoming vehicle E01 are present at the intersection, if the second oncoming vehicle E02 is present in the first common blind spot region E10 common to the attention region E08 and the blind spot region E09, the vehicle 5 cannot recognize the second oncoming vehicle E02. If this situation where the vehicle 5 only recognizes the first common blind spot region E10 continues, the vehicle 5 needs to make a determination for stopping the vehicle 5 from running when the first oncoming vehicle E01 is present within the attention region. Thus, with only the second detection information from the in-vehicle sensor 51, the vehicle 5 is not allowed to run until the first oncoming vehicle E01 leaves. In this case, the operations of the vehicle 5 should be inefficient.

Thus, the vehicle 5 comprising the vehicle system 50 obtains the first detection information form the infrastructure sensor 31 around the intersection. That is, the infrastructure sensor 31 detects the first oncoming vehicle E01 in a detectable area and transmits the first detection information. In this way, a part of the blind spot region E09, which occurs when the first oncoming vehicle E01 is observed from the vehicle 5, can be detected.

However, even when the infrastructure sensor 31 performs detection, a blind spot region E11 due to the occlusion of the first oncoming vehicle E01 occurs. A region indicated by stripes is the blind spot region E11.

In this case, the blind spot information combination unit 54 can superimpose the first common blind spot region E10 and the blind spot region E11 obtained from the infrastructure sensor 31 to extract a first common blind spot region E1a in which the blind spot region E11 for the infrastructure sensor 31 and the blind spot region E09 for the in-vehicle sensor 51 within the predetermined region E08.

When there is the blind spot region E1a, the vehicle 5 comprising the vehicle system 50 takes account of the size and the like of the blind spot region E1a, and stops running when it is determined that the other object is present and runs when it is determined that no other object is present.

When there is a second oncoming vehicle E02 having a risk of collision in the first common blind spot region E10 but the vehicle 5 cannot recognize the presence of the second oncoming vehicle E02, the determination controller 55 in this vehicle system 50 rarely makes bad determinations, such as it is safe for running. Thus, this vehicle system 50 can avoid the collision with the other object and operate the vehicle 5 while assuring the safety.

In addition, since this vehicle system 50 determines whether the other object is present while taking account of the size and the like of the blind spot region E1a, inefficient operations, such as stopping the vehicle 5 from running only because there is a blind spot, can be prevented.

[Operations and Effects]

Next, operations and effects of the vehicle system 50, the method of processing vehicle information, the recording medium storing a program, the traffic system 1, the infrastructure system, and the method of processing infrastructure information are described.

As described above, the vehicle system 50 according to this embodiment includes the information receiver 57, which obtains the first blind spot information from the infrastructure system 3 having the infrastructure sensor 31 detecting the surrounding object, the first blind spot information indicating the blind spot region due to the object observed from the infrastructure sensor 31, and the detection recognizer 52, which generates the second blind spot information indicating the blind spot region due to the object observed from the in-vehicle sensor 51 detecting the object. Then, the detection recognizer 52 has the blind spot information combination unit 54, which outputs the common blind spot information indicating the first common blind spot region common to the blind spot regions based on the first blind spot information and the second blind spot information to the external device.

In this way, the information receiver 57 obtains the first blind spot information on the blind spot, which occurs when the object is observed from the infrastructure sensor 31, from the object detected by the infrastructure sensor 31. The detection recognizer 52 generates the second blind spot information on the blind spot for the in-vehicle sensor 51 detecting the object. The blind spot information combination unit 54 can recognize that there is the first common blind spot region that is a blind spot common in a case where the object is observed from the infrastructure sensor 31 and a case where the object is observed from the in-vehicle sensor 51, by combining the blind spot regions based on the first blind spot information and the second blind spot information.

Thus, using the first common blind spot region, this vehicle system 50 can allow the vehicle 5 to run safely.

The method of processing vehicle information according to this embodiment includes: obtaining the first blind spot information from the infrastructure system 3 having the infrastructure sensor 31 detecting the surrounding object, the first blind spot information indicating the blind spot region due to the object observed from the infrastructure sensor 31; generating the second blind spot information indicating the blind spot region due to the object observed from the in-vehicle sensor 51 detecting the object; and outputting the common blind spot information indicating the first common blind spot region common to the blind spot regions based on the first blind spot information and the second blind spot information to the external device. The recording medium storing a program according to this embodiment causes a computer to execute the method of processing vehicle information. The traffic system 1 according to this embodiment includes the infrastructure system 3 that has: the infrastructure sensor 31 that detects the surrounding object; and the information generation unit that outputs the first blind spot information indicating the blind spot region due to the object observed from the infrastructure sensor 31 to the vehicle 5, and the vehicle system 50 that has: the vehicle sensor 51 that detects the object; the detection recognizer 52 that generates the second blind spot information indicating the blind spot region due to the object observed from the in-vehicle sensor 51; and the blind spot information combination unit 54 that outputs the common blind spot information indicating the first blind spot region common to the blind spot regions based on the first blind spot information and the second blind spot information to the external device.

In these method of processing vehicle information, the recording medium storing a program, and the traffic system 1, the same operations and effects as the above are attained.

The vehicle system 50 according to this embodiment further comprises the determination controller 55, which controls the running of the vehicle 5 in accordance with the common blind spot information.

According to this configuration, the determination controller 55 can control the running of the vehicle 5 in accordance with the common blind spot information. For example, the determination controller 55 can stop the vehicle 5 from running when there is the first common blind spot region, and can allow the vehicle 5 to run when there is no first common blind spot region.

In the vehicle system 50 according to this embodiment, the determination controller 55 determines whether the size of the first common blind spot region is larger than the predetermined size. The determination controller 55 allows the vehicle 5 to run when the size of the first common blind spot region is equal to or smaller than the predetermined size. The determination controller 55 stops the vehicle 5 from running when the size of the first common blind spot region is larger than the predetermined size.

In this way, when the size of the first common blind spot region is equal to or smaller than the predetermined size, the determination controller 55 can determine that there is no other object present within the first common blind spot region. Thus, if the predetermined size as the minimum size of the other object to be detected is determined in advance, the predetermined size can be set as a threshold, and a small blind spot region can be thus ignored. In this case, the determination controller 55 can determine to allow the vehicle 5 to run.

When the size of the first common blind spot region is larger than the predetermined size, the determination controller 55 can determine that there is the other object present within the first common blind spot region. That is, because there is the possibility that the other object is present within the first common blind spot region, the determination controller 55 can determine to stop the vehicle 5 from running.

Thus, this vehicle system 50 can increase the chance of determining to allow the vehicle 5 to run, and decrease of the safety during the running of the vehicle 5, such as occurrence of collision between the vehicle 5 and an object, is hardly occurred. As a result, this vehicle system 50 enhances the running efficiency of the vehicle 5.

In the vehicle system 50 according to this embodiment, the determination controller 55 extracts the attention region for controlling the vehicle 5 based on at least the running direction and the speed of the object. When there is the second common blind spot region common to the blind spot region due to the object and the attention region, in the case of being observed from the in-vehicle sensor 51, the determination controller 55 stops the vehicle 5 from running.

In this way, the determination controller 55 extracts the attention region based on the running direction and the speed of the object, and stops the vehicle 5 from running when there is the object in the attention region. Thus, even when there is the other object in the blind spot region behind the object observed from the vehicle 5, the collision between the vehicle 5 and the other object can be avoided. Hence, the vehicle 5 can run safely.

The vehicle system 50 according to this embodiment further comprises a storage that stores the road atlas information for enabling the vehicle 5 to run. The determination controller 55 at least superimposes the first and second blind spot information onto the road atlas information.

In this way, since the first and second blind spot information are superimposed onto the road atlas information, the first common blind spot region can be mapped on the road atlas information. Thus, the determination controller 55 can control the running of the vehicle 5 based on the road atlas information indicating the first common blind spot region.

In the vehicle system 50 according to this embodiment, the determination controller 55 estimates the predicted trajectory from when the vehicle 5 starts the predetermined running to when the vehicle 5 finishes the predetermined running. The determination controller 55 determines whether the estimated arrival-predicted period until the other object reaches the predicted trajectory is longer than the estimated passage period in which the vehicle 5 finishes passing the predicted trajectory. When the arrival-predicted period is longer than the passage period, the determination controller 55 allows the vehicle 5 to run. When the arrival-predicted period is equal to or shorter than the passage period, the determination controller 55 stops the vehicle 5 from running.

Thus, since the moving speed of the object is slow when the arrival-predicted period Et is longer than the passage period t, it can be estimated that the possibility of collision between the vehicle 5 and the object is low. Since the moving speed of the object is fast when the arrival-predicted period Et is equal to or shorter than the passage period t, it can be estimated that there is the possibility of collision between the vehicle 5 and the second oncoming vehicle E02. Thus, the determination controller 55 performs control to allow the vehicle 5 to run when the arrival-predicted period Et is longer than the passage period t, and to stop the vehicle 5 from running when the arrival-predicted period Et is equal to or shorter than the passage period t. Hence, this vehicle system 50 allows the vehicle 5 to run more safely.

In addition, in the vehicle system 50 according to this embodiment, the information receiver 57 obtains the first object information on the object observed from the infrastructure sensor 31. Moreover, the detection recognizer 52 outputs the second object information on the object observed from the in-vehicle sensor 51. The object combination unit 53 then combines the first object information and the second object information.

In this way, since the object combination unit 53 combines the first object information and the second object information, the information such as location and speed of the object can be accurately detected. Thus, the location and speed and the like of the object can be checked.

(Embodiment 2)

Figure 13:
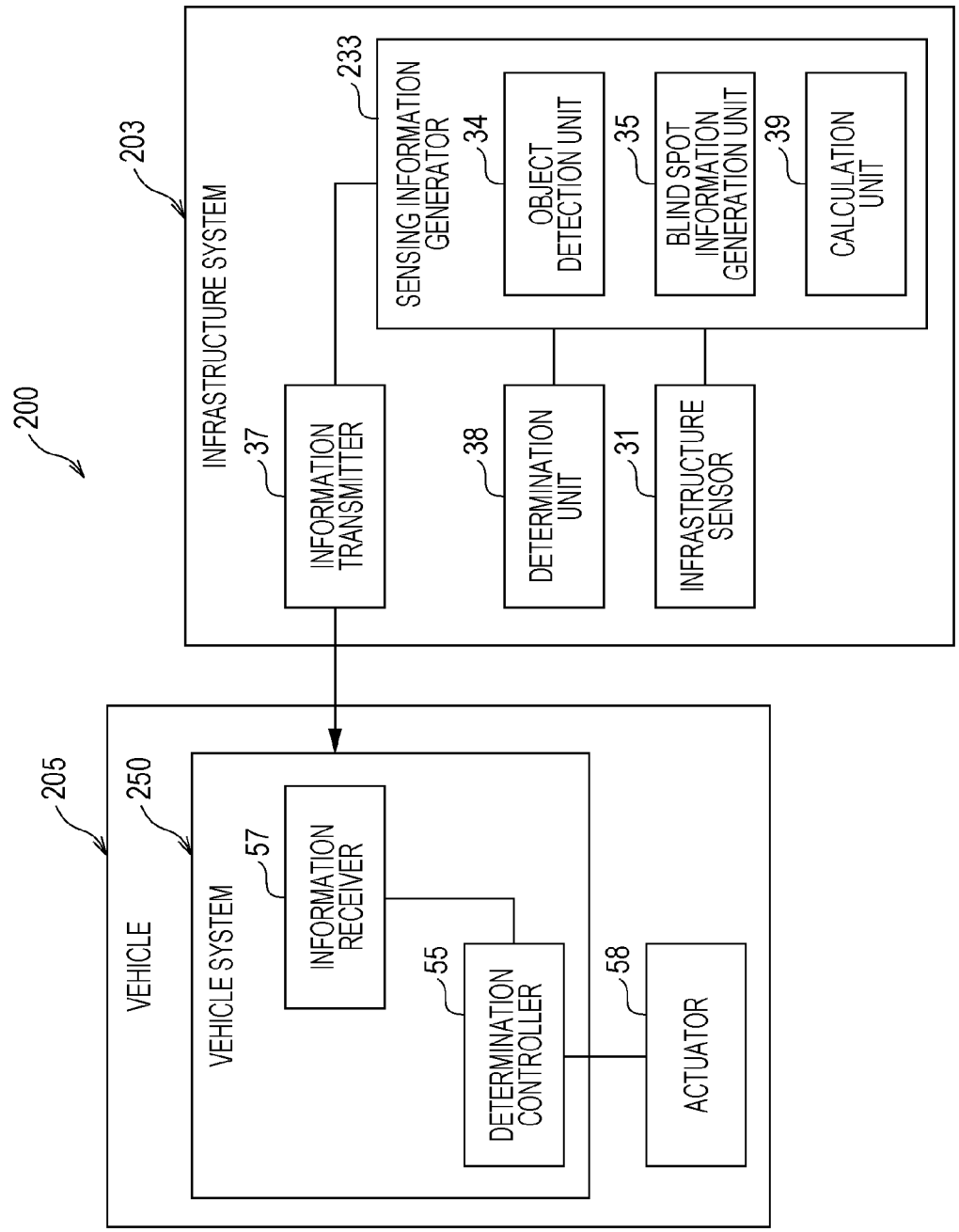
FIG. 13 is a block diagram illustrating an example of a configuration of a traffic system according to Embodiment 2.

FIG. 13 is a block diagram illustrating an example of a configuration of a traffic system 200 according to Embodiment 2.

As illustrated in FIG. 13, the traffic system 200 is a system that calculates a common blind spot region from an object detected by a vehicle system 250 and an infrastructure system 203 and controls a vehicle 205 based on the blind spot region. The vehicle 205 instrumented with the vehicle system 250 in this embodiment is assumed to be an automated driving vehicle in which the vehicle system 250 controls running, stopping, and the like of the vehicle 205.

The traffic system 200 comprises the infrastructure system 203 and the vehicle system 250.

The infrastructure system 203 is a system that detects a surrounding object and transmits the detected information to the vehicle system 250. For example, in order to detect an object such as a vehicle and a person on a road, the infrastructure system 203 is installed on a place such as a roadside that allows the infrastructure system 203 to detect a predetermined region.

The infrastructure system 203 has the infrastructure sensor 31, a sensing information generator 233, a determination unit 38, and the information transmitter 37.

The infrastructure sensor 31 is a sensor that can detect the surrounding object, and for example, the infrastructure sensor 31 detects the state of the object on the road. Specifically, the infrastructure sensor 31 generates the first detection information such as location, size, and speed of the object present within the detectable detection target area, for example. The infrastructure sensor 31 is a laser range finder (LRF), a light detection and ranging or laser imaging detection and ranging (LIDAR) sensor, a camera, a millimeter-wave radar, and the like, for example. The infrastructure sensor 31 outputs the generated first detection information on the object to the sensing information generator 233.

As illustrated in FIG. 13, the sensing information generator 233 has not only the object detection unit 34 and the blind information generation unit 35 but also a calculation unit 39.

Based on a predetermined period, at intervals of which the infrastructure sensor 31 performs detection, and a length of the blind spot region in the depth direction in a case where the object is observed from the infrastructure sensor 31, the calculation unit 39 in the sensing information generator 233 calculates a speed of the other object presumed to be in the blind spot region due to the object and outputs the speed information indicating the speed to the vehicle 205. The calculation of the speed of the other object is not limited to be performed by the calculation unit 39 and may be performed by the determination unit 38, for example.

Specifically, the calculation unit 39 calculates the speed of the object present within the blind spot region indicated by the first blind spot information. A time when the object starts to be visible from the infrastructure sensor 31 is t0, a time when the infrastructure sensor 31 detects the object after the time t0 is t1, the speed of the object is Vm, and a length of the blind spot region due to the object in the depth direction of the object is Lb0. In this case, a sampling cycle indicated by the times t0 and t1 is T, and then the average maximum speed of the other object present in the blind spot region is expressed by the following equation (1).

$$Vm = \frac{Lb0}{T} \quad (1)$$

The sampling cycle herein is a cycle in which the infrastructure sensor 31 performs detection periodically and is an example of a predetermined period. The infrastructure sensor 31 generates the first detection information in every sampling cycle.

Since the infrastructure sensor 31 detects an object in every sampling cycle, the object detection unit 34 associates the first object information generated last time with the first object information generated this time to output the first object information to the determination unit 38. When there is no first object information generated last time, the object detection unit 34 outputs the first object information to the determination unit 38 without performing association. The case where there is no past first object information is a case where the infrastructure sensor 31 detects the object for first time.

In order to detect the object in every sampling cycle in which the infrastructure sensor 31 performs detection periodically, the blind spot information generation unit 35 associates the first blind spot information generated this time with the first blind spot information generated last time, and outputs the associated first blind spot information to the determination unit 38. When there is no associated past first blind spot information, the blind spot information generation unit 35 outputs the first blind spot information to the determination unit 38 without performing association.

Starting from a first time point ta, a second time point when the infrastructure sensor 31 performs detection is tb, and a length of the blind spot region in the depth direction occurred due to the object at the first time point to is Lb1. In this case, if the speed of the object is V, and a period from the first time point ta to the second time point tb is a detection period Tc, a distance Lv1 moved by the object during the detection period Tc is calculated using Lv1=V× Tc. The average maximum speed of the other object present in the blind spot region is expressed by the following equation (2).

$$Vm = \frac{(Lv1 + Lb1)}{T} \quad (2)$$

The detection period herein is a period in which the object at between the first time point and the second time point is detected, and is an example of the predetermined period.

The determination unit 38 determines whether the first blind spot information generated by the sensing information generator 233 is associated with another first blind spot information. When the determination unit 38 determines that the first blind spot information is not associated with the other first blind spot information, the calculation unit 39 uses Equation (1) to calculate the speed of the object present within the blind spot region indicated by the first blind spot information. When the determination unit 38 determines that the first blind spot information is not associated with the other first blind spot information, it means that the infrastructure sensor 31 detects the object for first time, and that there is no past information indicating that the infrastructure sensor 31 detects the object.

When the determination unit 38 determines that the first blind spot information is associated with the other first blind spot information, the calculation unit 39 calculates the moving distance of the object using the first object information generated last time and the first object information generated this time by the object detection unit 34. The calculation unit 39 then uses Equation (2) to calculate the speed of the object present within the blind spot region indicated by the first blind spot information. When the determination unit 38 determines that the first blind spot information is associated with the other first blind spot information, it means that the infrastructure sensor 31 detects the object for at least the predetermined period, and that there is past information that the infrastructure sensor 31 detects the object.

The determination unit 38 transmits the speed information indicating the speed of the object calculated using Equation (1) or (2) to the vehicle system 250 of the vehicle 205 via the information transmitter 37.

The vehicle system 250 has the determination controller 55 and the information receiver 57. That is, it is optional for this embodiment to include the in-vehicle sensor 51, the detection recognizer 52, and the road atlas database 56 as illustrated in Embodiment 1.

The determination controller 55 obtains the speed information indicating the speed of the object from the infrastructure system 203 and determines whether to allow running, stopping, or the like of the vehicle 205. Hereinafter, the determination on whether to allow running, stopping, or the like of the vehicle 205 is described using FIGS. 14A to 15B.

Figure 14A:
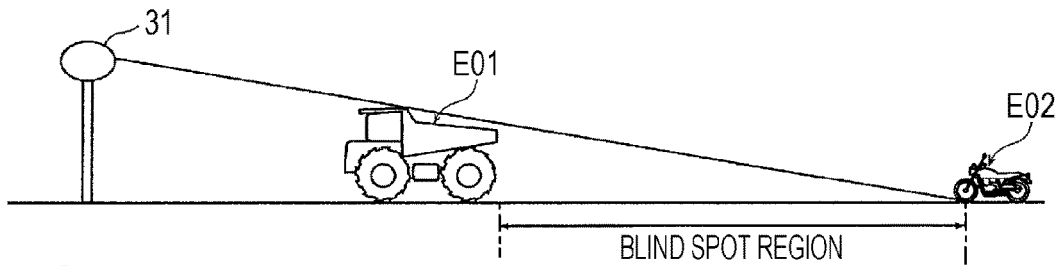
FIGS. 14A and 14B are schematic diagrams illustrating a second oncoming vehicle while a first oncoming vehicle is stopping.
Figure 14B:
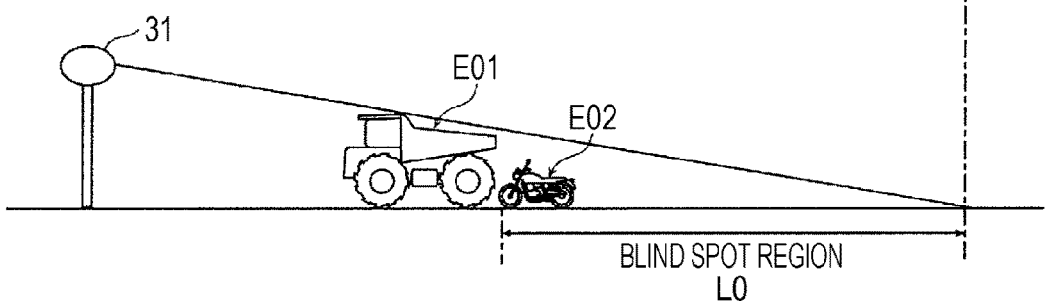

FIGS. 14A and 14B are schematic diagrams illustrating the second oncoming vehicle E02 while the first oncoming vehicle E01 is stopping. FIG. 14A is a diagram in which, at a first time point, the second oncoming vehicle E02 enters the blind spot region due to the first oncoming vehicle E01 to run toward the first oncoming vehicle E01. FIG. 14B is a diagram in which, at a second time point, the second oncoming vehicle E02 in the blind spot region due to the first oncoming vehicle E01 is running toward the first oncoming vehicle E01. FIG. 14B illustrates the situation where the second oncoming vehicle E02 has run for a distance L0.

As illustrated in FIGS. 14A and 14B, when the object is stopping, it is estimated that there is the second oncoming vehicle E02 in the blind spot region due to the first oncoming vehicle E01. In this case, a length of the blind spot region behind the first oncoming vehicle E01 is also L0, the first time point when the detection is performed is ta, and the second time point when the detection is performed after a predetermined period is passed is tb. Using Equation (2), it is estimated that, for example, when the second oncoming vehicle E02 is present within the blind spot region behind the first oncoming vehicle E01 in the predetermined period of tb−ta, the speed of the second oncoming vehicle E02 is equal to or lower than Vm=L0/(tb−ta). When the infrastructure sensor 31 cannot detect the second oncoming vehicle E02 although the predetermined period tb−ta is passed, it can be estimated that the running speed of the second oncoming vehicle E02 is not that fast.

The length of the blind spot region herein is a sum of the distance moved by the object during the detection period and the length of the blind spot region at the first time point. In FIGS. 14A and 14B, since the object is stopping, the length of the blind spot region is the length of the blind spot region at the first time point.

Figure 15A:
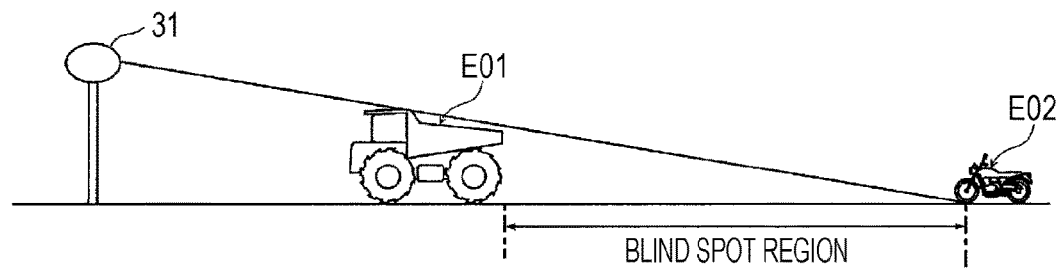
FIGS. 15A and 15B are schematic diagrams illustrating the second oncoming vehicle while the first oncoming vehicle is moving slowly.
Figure 15B:
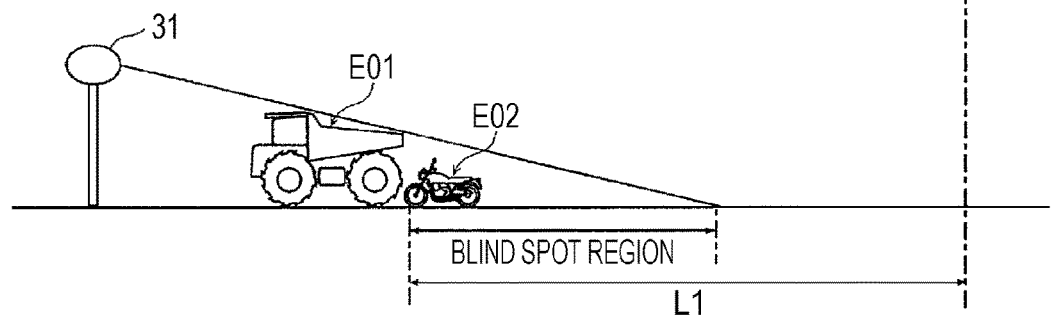

FIGS. 15A and 15B are schematic diagrams illustrating the second oncoming vehicle E02 while the first oncoming vehicle E01 is moving slowly. FIG. 15A is a diagram in which, at a first time point, the second oncoming vehicle E02 enters the blind spot region due to the first oncoming vehicle E01 to run toward the first oncoming vehicle E01. FIG. 15B is a diagram in which, at a second time point, the second oncoming vehicle E02 in the blind spot region due to the first oncoming vehicle E01 is running toward the first oncoming vehicle E01. FIG. 15B illustrates the situation where the second oncoming vehicle E02 has run for a distance L1.

As illustrated in FIGS. 15A and 15B, or, when the object is moving slowly toward the vehicle 205, since the first oncoming vehicle E01 itself is moving slowly, the possibility of posing the risk to the vehicle 205 is low. However, in this case, a period in which the blind spot region due to the first oncoming vehicle E01 occurs becomes long. When it is estimated that there is the second oncoming vehicle E02 in this blind spot region, with a few seconds of the predetermined period for example, it can be thought that the distance moved by the first oncoming vehicle E01 is short, and also the size of this blind spot region is not changed that much. Here, when the infrastructure sensor 31 detects no second oncoming vehicle E02 even when the predetermined period tb−ta is passed, it can be estimated that the running speed of the second oncoming vehicle E02 is not that fast.

In FIGS. 15A and 15B, since the object is moving, the length of the blind spot region is a sum of the distance Lv1 moved by the object during the detection period and the length Lb1 of the blind spot region at the first time point; that is, Lv1+Lb1. In this case, it can be estimated that the speed of the second oncoming vehicle E02 is equal to or lower than Vm=(Lv1+Lb1)/(tb−ta).

From these, when the distance from the predicted trajectory of the vehicle 205 to the other object is La, and a time from when the vehicle 205 starts to turn at the intersection to when the vehicle 205 finishes the turning, or, a time in which the vehicle 205 passes the predicted trajectory, is tc, it can be thought that determination on whether the second oncoming vehicle E02 and the vehicle 205 collide can be made by determining whether a condition of Vm<La/tc is met.

The determination controller 55 determines whether the speed Vm of the object is lower than the speed La/tc of the other object. When it is determined that the speed Vm of the object is lower than the speed La/tc of the other object, the determination controller 55 controls the actuator 58 to allow the vehicle 205 to run. That is, even though the second oncoming vehicle E02 is present within the blind spot region behind the first oncoming vehicle E01, it can be estimated that the running speed of the second oncoming vehicle E02 is not that fast. Thus, since it can be determined that the vehicle 205 and the second oncoming vehicle E02 hardly collide, the determination controller 55 allows the vehicle 205 to run.

On the other hand, when it is determined that the speed Vm of the object is equal to or higher than the speed La/tc of the other object, the determination controller 55 controls the actuator 58 to stop the vehicle 205. That is, since the second oncoming vehicle E02 gets out from the blind spot region behind the first oncoming vehicle E01, it can be estimated that the running speed of the second oncoming vehicle E02 is fast. Thus, since there is the possibility of collision between the vehicle 205 and the second oncoming vehicle E02, the determination controller 55 stops the vehicle 205.

The information receiver 57 is a receiver device that obtains the first object information, the first blind spot information, and the like from the infrastructure system 203.

[Operations]

Next, operations of the traffic system 200 are described using FIG. 16.

FIG. 16 is a sequence diagram illustrating operations of the vehicle system 250 according to Embodiment 2.

As illustrated in FIG. 16, firstly, the infrastructure sensor 31 detects location, speed, and the like of the other object entering the blind spot region behind the object (S201) and generates the first detection information. The infrastructure sensor 31 then outputs the first detection information to the sensing information generator 233. Although FIG. 16 exemplifies a case of one object, when there are multiple objects, the infrastructure sensor 31 outputs corresponding first detection information on the respective objects to the sensing information generator 233.

Next, the object detection unit 34 of the sensing information generator 233 detects the object from the first detection information and generates the first object information such as speed and location of the object observed from the infrastructure sensor 31 (S202). The object detection unit 34 outputs the first object information to the blind spot information generation unit 35.

Next, the blind spot information generation unit 35 obtains the first object information, calculates the blind spot region resulting from the occlusion, and generates the first blind spot information indicating the blind spot region due to the object (S203). The first blind spot information is the speed, location, and the like of the blind spot region due to the object detected by the infrastructure sensor 31.

In the infrastructure system 203, since the infrastructure sensor 31 detects the object in every sampling cycle, every time the infrastructure sensor 31 detects the object, the object detection unit 34 generates the first object information, and the blind spot information generation unit 35 generates the first blind spot information. Thus, the object detection unit 34 associates the first object information generated this time with the first object information generated last time and outputs the associated first object information to the determination unit 38. The blind spot information generation unit 35 associates the first blind spot information generated this time with the first blind spot information generated last time and outputs the associated first blind spot information to the determination unit 38.

Next, the determination unit 38 determines whether the first blind spot information is associated with the other first blind spot information (S204). The determination unit 38 may make the determination according to whether the first blind spot information is associated with a defined number or more of the other first blind spot information.

When the determination unit 38 determines that the first blind spot information is not associated with the other first blind spot information (No in S204), the calculation unit 39 of the sensing information generator 233 uses Equation (1) to calculate the speed of the other object present within the blind spot region indicated by the first blind spot information (S205).

On the other hand, when the determination unit 38 determines that the first blind spot information is associated with the other first blind spot information (Yes in S204), the calculation unit 39 calculates the sum of the moving distance of the object making the blind spot region and the length of the blind spot region in the depth direction due to the object at the first time point (S206). The calculation unit 39 calculates the moving distance of the object from the first object information generated by the object detection unit 34 at the first and second time points.

Next, the calculation unit 39 uses Equation (2) to calculate the speed of the other object present within the blind spot region indicated by the first blind spot information (S207).

Then, after step S205, or after steps S206 and S207, the sensing information generator 233 transmits the speed information indicating the speed of the object to the vehicle system 250 of the vehicle 205 via the information transmitter 37 (S208).

Next, the determination controller 55 of the vehicle system 250 obtains the speed information and determines whether the speed Vm of the object indicated by the speed information is lower than the speed La/tc of the other object (S211).

When it is determined that the speed Vm of the object is equal to or higher than the speed La/tc of the other object (No in S211) and there is the other object present within the blind spot region behind the object, the determination controller 55 determines that there is the risk of collision between the vehicle 205 and the object. Thus, the determination controller 55 transmits the control signal to the actuator 58 of the vehicle 205 and stops the vehicle 205 from running (S212).

On the other hand, when it is determined that the speed Vm of the object is lower than the speed La/tc of the other object (Yes in S211), even though there is the other object present within the blind spot region behind the object, the determination controller 55 determines that the risk of collision between the vehicle 205 and the object is low. Thus, the determination controller 55 transmits the control signal to the actuator 58 of the vehicle 205 and allows the vehicle 205 to run (S213).

In this way, this infrastructure system 203 can determine whether the vehicle 205 can travel safely by calculating the speed of the other object present in the blind spot region behind the object and transmitting the speed information indicating the speed of the object to the vehicle 205. Thus, the vehicle 205 can travel safely.

[Operations and Effects]

Next, operations and effects of the infrastructure system 203 and the method of processing infrastructure information of this embodiment are described.

As described above, the infrastructure system 203 according this embodiment includes the infrastructure sensor 31 that detects the surrounding object, and the sensing information generator 233 that extracts the blind spot region behind the object detected by the infrastructure sensor 31. Based on the predetermined period, at intervals of which the infrastructure sensor 31 performs detection, and the length of the blind spot region in the depth direction in the case where the object is observed from the infrastructure sensor 31, the sensing information generator 233 calculates the speed of the other object presumed to be in the blind spot region due to the object, and outputs the speed information indicating the speed to the vehicle 205.

In this way, based on the predetermined period, at intervals of which the infrastructure sensor 31 performs detection, and the length of the blind spot region in the depth direction in the case where the object is observed from the infrastructure sensor 31, the sensing information generator 233 calculates the speed of the other object presumed to be in the blind spot region and outputs the speed information indicating the speed to the vehicle 205. Thus, the vehicle 205 that obtains the speed information can determine whether to allow running, stopping, or the like of the vehicle 205 based on the speed information.

Thus, in this infrastructure system 203, the vehicle 205 can run safely.

The method of processing infrastructure information according to this embodiment includes: allowing the infrastructure sensor 31 to detect the surrounding object; extracting the blind spot region due to the object detected by the infrastructure sensor 31; calculating the speed of the other object presumed to be in the blind spot region due to the object, based on the predetermined period, at intervals of which the infrastructure sensor 31 performs detection, and the length of the blind spot region in the depth direction in which the object is observed from the infrastructure sensor 31; and outputting the speed information indicating the speed to the vehicle 205.

Also in this method of processing the infrastructure information, the same operations and effects as that of the infrastructure system 203 are attained.

In the infrastructure system 203 according to this embodiment, the predetermined period is the detection period between the first time point and the second time point at each of which of the object is detected. The length of the blind spot region is the sum of the distance moved by the object during the detection period and the length of the blind spot region at the first time point.

In this way, the sensing information generator 233 can estimate the speed of the other object present within the blind spot region behind the object from the sum of the distance moved by the object during the detection period in which the object is detected and the length of the blind spot region in the depth direction at the first time point. Thus, if the sensing information generator 233 outputs the speed information indicating the speed to the vehicle 205, the vehicle 205 can run, stop, or do the like based on the speed information.

In the infrastructure system 203 according to this embodiment, the predetermined period is the sampling cycle at intervals of which the infrastructure sensor 31 performs detection periodically.

In this way, the sensing information generator 233 can estimate the speed of the other object present within the blind spot region behind the object detected by the infrastructure system 31 in every sampling cycle. Thus, if the sensing information generator 233 outputs the speed information indicating the speed to the vehicle 205, the vehicle 205 can run, stop, or do the like based on the speed information.

(Embodiment 3)

Figure 17:
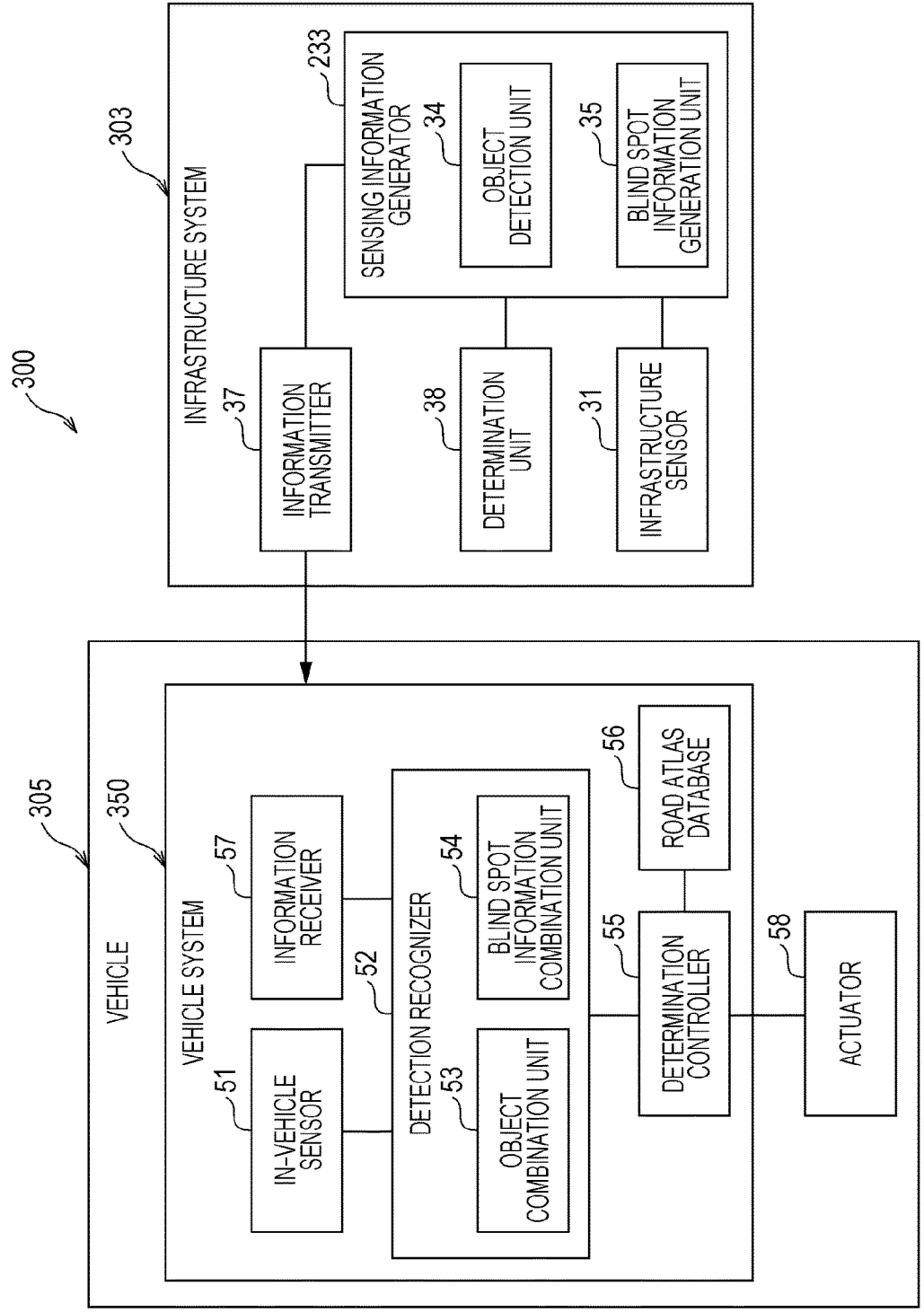
FIG. 17 is a block diagram illustrating an example of a configuration of a traffic system according to Embodiment 3.

A configuration of the infrastructure system 303 according to this embodiment is described using FIG. 17.

FIG. 17 is a block diagram illustrating an example of the configuration of a traffic system 300 according to Embodiment 3.

In this embodiment, it is different from Embodiment 2 that the vehicle system 350 further has the in-vehicle sensor 51, the detection recognizer 52, and the road atlas database 56. The traffic system 300 in this embodiment is similar to Embodiment 1 and the like unless otherwise stated, and the same configuration is denoted by the same reference numeral to omit detailed description for the configuration.

As illustrated in FIG. 17, the vehicle system 350 comprises not only the determination controller 55 and the information receiver 57 but also the in-vehicle sensor 51, the detection recognizer 52, and the road atlas database 56.

The in-vehicle sensor 51 is a sensor that detects the surrounding situation, and for example, the in-vehicle sensor 51 detects an object around the vehicle 305 or in the running direction of the vehicle 305. Specifically, the in-vehicle sensor 51 generates the second detection information such as location, size, and speed of the object present within the detectable detection target area, for example. The in-vehicle sensor 51 is an LRF, a camera, a LIDAR sensor, a millimeter-wave radar, and the like, for example. The in-vehicle sensor 51 outputs the generated second detection information on the object to the detection recognizer 52.

From the second detection information on the object obtained by the in-vehicle sensor 51, the detection recognizer 52 generates the second object information such as size, shape, speed, and location of the object observed from the in-vehicle sensor 51, and second blind spot information indicating the blind spot region due to the object. The detection recognizer 52 receives the first object information and the first blind spot information from the infrastructure system 303 via the information receiver 57.

The detection recognizer 52 has the object combination unit 53 and the blind spot information combination unit 54.

Based on the second detection information obtained from the in-vehicle sensor 51, the object combination unit 53 detects the object present within the detection target area and generates the second object information such as location, size, and speed of the object detected by the in-vehicle sensor 51. The object combination unit 53 is an example of a combination unit.

The object combination unit 53 outputs the object combined information, which is a combination of the second object information generated from the second detection information and the first object information obtained from the infrastructure system 303, to the determination controller 55. The determination controller 55 reads the road atlas information of the surroundings of the vehicle 305 from the road atlas database 56 storing the road information and the like, generates object map information in which the object combined information is mapped onto the road atlas information, and outputs the generated object map information to the blind spot information combination unit 54. The object combination unit 53 may read the road atlas information of the surroundings of the vehicle 305 from the road atlas database 56, may generate the object map information, and may output the generated object map information to the blind spot information combination unit 54.

From the second object information generated by the object combination unit 53, the blind spot information combination unit 54 calculates the blind spot region due to the occlusion as illustrated in FIG. 3. The blind spot information combination unit 54 also calculates the blind spot region resulting from the FOV included in the second detection information from the in-vehicle sensor 51. The blind spot information combination unit 54 superimposes the blind spot region resulting from the occlusion and the blind spot region resulting from the FOV to extract the blind spot region for the in-vehicle sensor 51. In this way, the blind spot information combination unit 54 generates the second blind spot information such as location and size of the blind spot region for the in-vehicle sensor 51. The blind spot information combination unit 54 is an example of a combination unit.

The blind spot information combination unit 54 outputs the common blind spot information, which indicates a first common blind spot region common to the blind spot regions based on the first blind spot information and the second blind spot information, to the external device. Specifically, the blind spot information combination unit 54 extracts the first common blind spot region common to the blind spot region included in the second blind spot information generated from the second detection information and a blind spot region included in the first blind spot information obtained from the infrastructure system 303. The blind spot information combination unit 54 outputs the common blind spot information indicating the extracted first common blind spot region to the external device. The external device is the determination controller 55, the road atlas database 56, and the like, for example. Otherwise, the external device may be a display equipped in the vehicle 305, a drive controller to control driving of the vehicle 305, and the like.

The blind spot information combination unit 54 generates map information in which the common blind spot information indicating the first common blind spot region is further mapped onto the object map information. That is, the map information becomes road atlas information in which the first and second object information and the first and second blind spot information are superimposed on each other. Specifically, the map information is information in which the blind spot region indicated by the first blind spot information and the blind spot region indicated by the second blind spot information are mapped onto the road atlas indicated by the road atlas information. The blind spot information combination unit 54 outputs the map information to the determination controller 55. In the map information, the first and second blind spot information other than the common blind spot information are also mapped. Note that, at least the first blind spot information and the second blind spot information are superimposed on each other in the map information.

The determination controller 55 controls running of the vehicle 305 in accordance with the common blind spot information. Specifically, the determination controller 55 uses the map information provided from the detection recognizer 52 to determine whether it is safe for the vehicle 305 to run. The determination controller 55 allows the vehicle 305 to run when it is determined that it is safe, and performs some controls such as stopping the vehicle 305 from running when it is determined that there is any danger. For example, the determination controller 55 controls an actuator 58 including an engine, a brake, a steering, and the like of the vehicle 305.

The determination controller 55 takes account of an attention region for controlling the vehicle 305 based on at least the running direction and the speed of the object. When the second common blind spot region common to the blind spot region due to the object and the attention region occurs in a case of being observed from the in-vehicle sensor 51, the determination controller 55 stops the vehicle 305 from running. Based on the attention region, the determination controller 55 determines whether to allow the vehicle 305 to run or to stop the vehicle 305. This attention region is described using FIG. 18.

Figure 18:
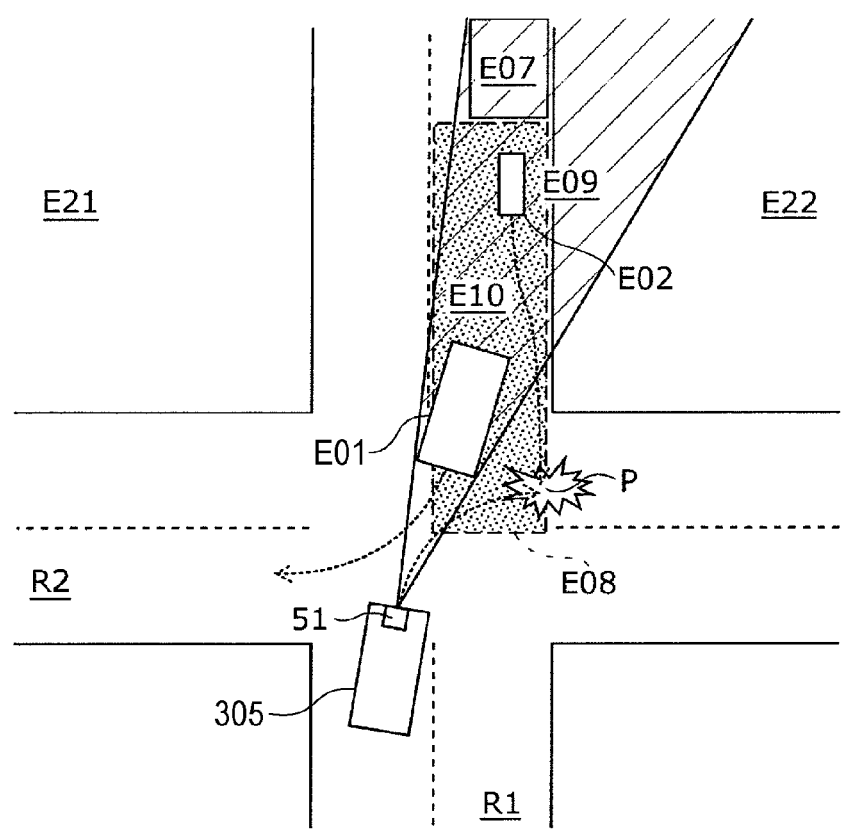
FIG. 18 is a diagram illustrating a typical example of an accident due to a blind spot while a vehicle is running.

FIG. 18 is a diagram illustrating a typical example of an accident due to a blind spot while the vehicle 305 is running. FIG. 18 exemplifies a situation just before the vehicle 305, which is turning right at an intersection, has a right-straight accident of collision with the second oncoming vehicle E02 running out from behind the first oncoming vehicle E01 at the point P. The right turn illustrated in FIG. 18 is an example, and the case is not limited to right turn and may be left turn, U-turn, circling, and the like. The first oncoming vehicle E01 is an example of the object. The second oncoming vehicle E02 is an example of the other object.

FIG. 18 illustrates the crossroad including the vertical first road R1 and the horizontal second road R2 crossing the first road R1. The vehicle 305 moving in the upward direction is waiting at the intersection of the first road R1 and the second road R2 in order to turn right at the intersection. Meanwhile, on the opposite side of the vehicle 305, the first oncoming vehicle E01 moving in the downward direction is waiting at the intersection in order to turn right at the intersection. In such a situation, when the in-vehicle sensor 51 of the vehicle 305 detects information of the surrounding objects E03, E21, E22, and the like, a region hidden behind the first oncoming vehicle E01 as one of the surrounding objects becomes the blind spot region E09 indicated with hatched lines. Even though there is the second oncoming vehicle E02 in this blind spot region E09, the in-vehicle sensor 51 of the vehicle 305 cannot recognize the second oncoming vehicle E02. Thus, if the vehicle 305 takes no account of the blind spot behind the first oncoming vehicle E01 and just keeps running, the vehicle 305 may be at risk of collision with the second oncoming vehicle E02 at the point P.

Thus, in a case where there is the first common blind spot region E10 common to the predetermined region E08 and the blind spot region E09 while the vehicle 305 is turning right at the intersection, if it is assumed that the second oncoming vehicle E02 is present in the first common blind spot region E10, it can be considered that the vehicle 305 may collide with the second oncoming vehicle E02. In this case, since the second oncoming vehicle E02 is close to the vehicle 305 at the intersection, the vehicle 305 turning right may collide with the second oncoming vehicle E02 coming straight. Note that the predetermined region E08 indicated with hatched dots and dashed line is an optional region that extends from an intersection point of a trajectory of the vehicle 305 turning right and a trajectory of the second oncoming vehicle E02 running straight to a side from which the second oncoming vehicle E02 comes.

There may be a case where there is the third oncoming vehicle E07 within the blind spot region E09 far from the first oncoming vehicle E01. The third oncoming vehicle E07 is located outside the predetermined region E08. In this case, since the third oncoming vehicle E07 is far from the vehicle 305, it takes time to reach the intersection even though the third oncoming vehicle E07 comes straight, and thus the possibility of collision between the vehicle 305 and the third oncoming vehicle E07 is low. The third oncoming vehicle E07 is an example of the other object.

In this point of view, a region that has to be actually concerned when the vehicle 305 turns right is the predetermined region E08, which is the blind spot region E09 without the third oncoming vehicle E07. That is, this predetermined region E08 is the attention region.

As illustrated in FIG. 17, the attention region may be stored as the region information in the road atlas database 56 of the vehicle system 350 in advance. The determination controller 55 may call the attention region as necessary, and based on the information about lanes and the like included in the road atlas database 56, the determination controller 55 may automatically map the attention region onto a map that is indicated in the object map information, or a map indicated in the map information.

In this way, the right-straight accident can be avoided if the vehicle 305 sequentially creates the attention region according to the running plan and turns right after confirming that there is no object within the attention region that the vehicle 305 may collide with.

The determination controller 55 determines whether to allow the vehicle 305 to run or to stop the vehicle 305 based on a period until the second oncoming vehicle E02 reaches the intersection.

Figure 19:
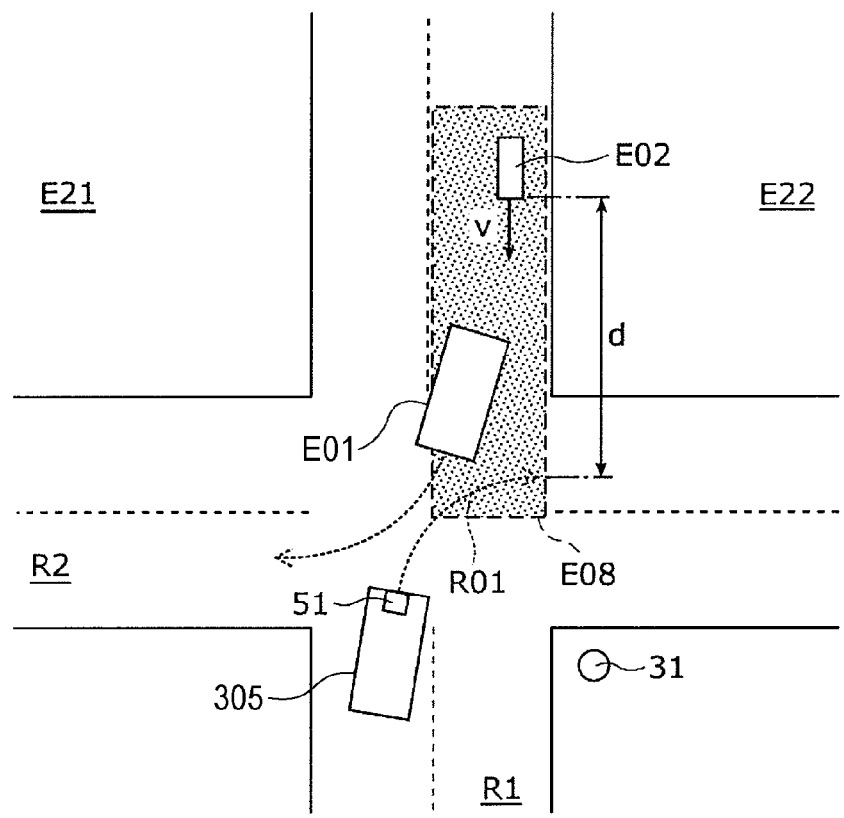
FIG. 19 is a schematic diagram illustrating a relationship between an object and a predicted trajectory of the vehicle.

FIG. 19 is a schematic diagram illustrating a relationship between an object and a predicted trajectory of the vehicle 305.

As illustrated in FIG. 19, the determination controller 55 estimates a predicted trajectory that the vehicle 305 passes while changing direction and calculates an estimated passage period until the vehicle 305 finishes passing the predicted trajectory. The predicted trajectory herein is a trajectory from where the vehicle 305 starts predetermined running to where the vehicle 305 finishes the predetermined running. For example, in a case of turning right, the predicted trajectory is a trajectory denoted by R01 on which it can be estimated that the vehicle 305 runs, from when the vehicle 305 starts turning right to when the vehicle 305 finishes the right turn. The change in direction herein has meanings including turn right, turn left, U-turn, circling, and the like.

Based on the second detection information from the in-vehicle sensor 51 or the first detection information from the infrastructure sensor 31, the determination controller 55 obtains the moving speed v of the second oncoming vehicle E02. In order to obtain the moving speed of the second oncoming vehicle E02, a value such as Doppler velocity that can be detected by the sensor side may be used, or a value obtained by the detection recognizer 52 that performs chronological tracking may be used, for example.

The determination controller 55 calculates an estimated arrival-predicted period until the second oncoming vehicle E02 reaches the predicted trajectory R01 of the vehicle 305. Specifically, assuming that a distance from a current location of the second oncoming vehicle E02 to the predicted trajectory R01 of the vehicle 305 is d, the estimated arrival-predicted period until the second oncoming vehicle E02 reaches the predicted trajectory R01 is Et, and the moving speed of the second oncoming vehicle E02 is v, the arrival-predicted period until the second oncoming vehicle E02 reaches the predicted trajectory R01 is calculated by Et=d/v. The distance d may be the maximum length in the depth direction of the attention region E08.

The determination controller 55 determines whether the estimated arrival-predicted period Et until the second oncoming vehicle E02 reaches the predicted trajectory is longer than an estimated passage period t until the vehicle 305 finishes passing the predicted trajectory.

If the period until the vehicle 305 finishes passing the predicted trajectory is short, the period until the second oncoming vehicle E02 reaches the predicted trajectory may be long; thus, it can be estimated that the possibility of collision between the vehicle 305 and the second oncoming vehicle E02 is low if the arrival-predicted period Et is longer than the passage period t. Hence, the determination controller 55 allows the vehicle 305 to run.

On the other hand, if the arrival-predicted period until the vehicle 305 finishes passing the predicted trajectory is long, the period until the second oncoming vehicle E02 reaches the predicted trajectory may be short; thus, it can be estimated that there is the possibility of collision between the vehicle 305 and the second oncoming vehicle E02 if the arrival-predicted period Et is equal to or shorter than the passage period t. Hence, the determination controller 55 stops the vehicle 305 from running.

The determination on whether the arrival-predicted period Et is longer than the passage period t is an example of determination on whether there is the possibility of collision between the vehicle 305 and the other object. For example, not only the simple determination on whether the arrival-predicted period Et is longer than the passage period t but also determination on whether a difference value between the arrival-predicted period Et and the passage period t is equal to or greater than a defined value may be made. In this case, for example, when a great value is set as the defined value, and the passage period t becomes sufficiently shorter than the arrival-predicted period Et, the determination controller 55 may estimate that the possibility of collision is low.

In addition, in FIG. 19, if the infrastructure sensor 31 detects the second oncoming vehicle E02, the vehicle 305 may obtain the information such as moving speed, size, and location of the second oncoming vehicle E02 from the infrastructure system 303. In this case, either of the infrastructure system 303 and the vehicle 305 may calculate the distance d.

Further, the determination controller 55 determines whether to allow the vehicle 305 to run or to stop the vehicle 305 based on the size of the first common blind spot region. That is, the determination controller 55 determines whether the first common blind spot region is larger than a predetermined size.

When the size of the first common blind spot region is equal to or smaller than the predetermined size, the determination controller 55 determines that there is no other object within the first common blind spot region and allows the vehicle 305 to run. On the other hand, when the size of the first common blind spot region is larger than the predetermined size, there may be the other object within the first common blind spot region; thus, the determination controller 55 determines that the other object is present within the first common blind spot region and stops the vehicle 305 from running.

In the calculation of the possibility of the collision between another object and the vehicle 305, it is necessary to approximately estimate whether the other object that may collide is a person or an automobile or estimate other things. Here, the size of another object assumed to collide is set in advance to be equal to or larger than that of a person. In this case, the predetermined size is naturally determined to be the minimum size of another object to be detected. For example, if a person viewed from above has a size of 40 cm square or larger, the predetermined size is 40 cm square, which is the minimum size of another object to be detected or. In this vehicle system 350, the predetermined size is preferred to be as small as possible in order to allow the blind spot information to precisely reproduce the blind spot region. Thus, the predetermined size is not limited to be 40 cm square or larger.

When the first common blind spot region is equal to or smaller than the predetermined size, it can be considered that the first common blind spot region is a small region; thus, it can be estimated that no other object to be detected is present within the first common blind spot region.

The road atlas database 56 is a storage device that stores the road atlas information for enabling the vehicle 305 to run. The determination controller 55 may obtain the road atlas information such as Japan Plane Rectangular Coordinate from an external server via networks using an unillustrated communication unit. The road atlas information may include the attention region in advance. The road atlas database 56 is an example of a storage.

The information receiver 57 is a receiver device that obtains the first object information, the first blind spot information, and the like from the infrastructure system 303. The information receiver 57 is an example of an obtainment unit. The detection recognizer 52 may be able to obtain the first object information, the first blind spot information, and the like from the infrastructure system 303. In this case, the detection recognizer 52 becomes an example of an obtainment unit.

[Operations]

Figure 20:
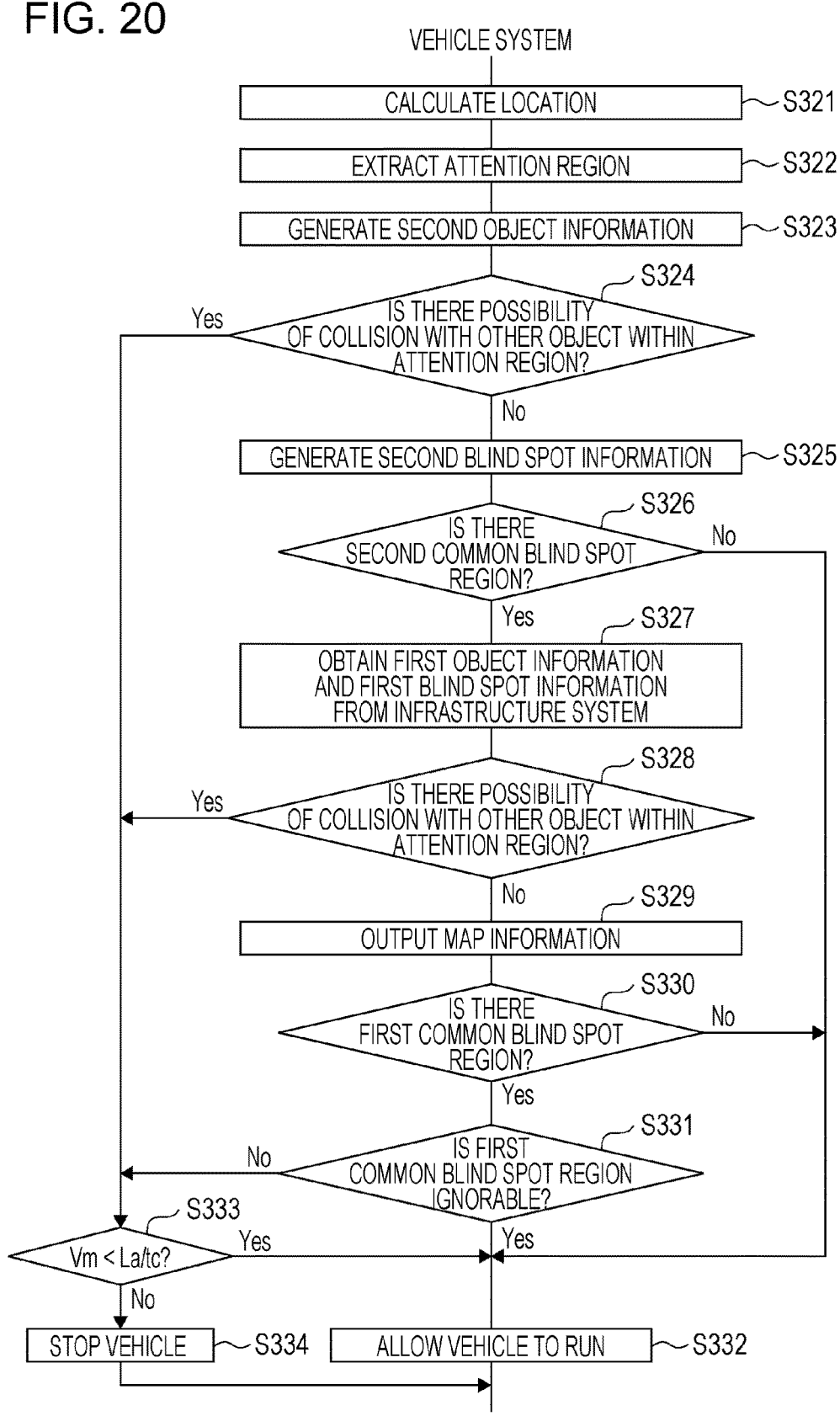
FIG. 20 is a sequence diagram illustrating operations of a vehicle system according to Embodiment 3.

Next, operations of the traffic system 300 is described using FIG. 20.

FIG. 20 is a sequence diagram illustrating operations of the vehicle system 350 according to Embodiment 3. In FIG. 20, since a part thereof is similar to the sequence diagram illustrating the operations of the infrastructure system 303 in FIG. 16, the procedure of the infrastructure system 303 in FIG. 16 is omitted. The speed information output in step S208 in FIG. 16 is obtained in later-described step S327 in FIG. 20 for example.

As illustrated in FIG. 20, firstly, the determination controller 55 calculates the location on the road atlas where the vehicle 305 is currently (S321). In this case, the in-vehicle sensor 51 is used for calculating the location of the vehicle 305 on the road atlas. The location of the vehicle 305 on the road atlas may be calculated using a satellite positioning system such as the global navigation satellite system (GNSS), data obtained from an LRF, and the like, for example.

Next, the determination controller 55 extracts the attention region from the road atlas database 56 of the vehicle 305 (S322). This extraction of the attention region is performed on a region in which the vehicle 305 is running or going to run.

Next, the detection recognizer 52 uses the second detection information detected by the in-vehicle sensor 51 to perform detection processing on the object around the vehicle 305. Specifically, the object combination unit 53 of the detection recognizer 52 detects an object present within the detection target area and generates the second object information (S323).

Next, the determination controller 55 determines whether there is the possibility of collision with the other object, such as an oncoming vehicle other than the object, within the attention region extracted in step S322 (S324).

When it is determined that there is the possibility of collision with the other object (Yes in S324), the determination controller 55 determines whether the speed Vm of the other object is lower than La/tc (S333). When it is determined that the speed Vm of the other object is smaller than La/tc (Yes in S333), the determination controller 55 transmits the control signal to the actuator 58 of the vehicle 305 to allow the vehicle 305 to run (S332). On the other hand, when it is determined that the speed Vm of the other object is equal to or higher than La/tc (No in S333), the determination controller 55 transmits the control signal to the actuator 58 of the vehicle 305 to stop the vehicle 305 from running (S334). The determination controller 55 then returns to step S321 and performs the same procedure. A method of determining whether the other object is present is described later.

On the other hand, when it is determined that there is no possibility of collision with the other object (No in S324), the detection recognizer 52 generates the second blind spot information using the second object information calculated by the object combination unit 53 (S325). The case where there is no possibility of collision with the other object includes the case of low possibility of collision with the other object. It is similar for the later-described step S328.

Next, the determination controller 55 determines whether there is the second common blind spot region common to the blind spot region due to the object and the attention region (S326).

When it is determined that there is the second common blind spot region (Yes in S326), the determination controller 55 obtains the first object information and the first blind spot information obtained from the infrastructure system 303 (S327).

On the other hand, when it is determined that there is no second common blind spot region (No in S326), and there is no other object detected, the determination controller 55 transmits the control signal to the actuator 58 of the vehicle 305 and allows the vehicle 305 to run (S332). That is, it can be said that there is no blind spot within the attention region when there is no blind spot region common to the attention region and the blind spot region indicated by the second blind spot information. Thus, it can be considered that the risk of the collision between the running vehicle 305 and the other object is low, and if no other object is detected, the determination controller 55 allows the vehicle 305 to run (S332). The determination controller 55 then returns to step S321 and performs the same procedures.

Even when it is No in step S326, the determination controller 55 stops the vehicle 305 from running if the other object is detected, and once no other object is detected, the determination controller 55 allows the vehicle 305 to run.

Next, in accordance with the first object information and the first blind spot information obtained from the infrastructure system 303 in step S327, the determination controller 55 determines whether there is the possibility of collision with the other object within the attention region extracted in step S322 (S328). A method of determining whether the other object is present is described later.

When it is determined that there is the possibility of collision with the other object within the attention region (Yes in S328), the determination controller 55 transmits the control signal to the actuator 58 of the vehicle 305, and the procedure proceeds to S333 to perform the processing of S333.

On the other hand, when the determination controller 55 determines that there is no possibility of collision with the other object within the attention region (No in S328), the detection recognizer 52 outputs the map information to the determination controller 55. Specifically, the object combination unit 53 outputs the object map information in which the second object information and the first object information are combined to the road atlas information, while the blind spot information combination unit 54 outputs the map information in which the second blind spot information and the first blind spot information are combined to the object map information (S329).

Next, in accordance with the map information, the determination controller 55 determines whether there is the first common blind spot region common to the blind spot region indicated by the first blind spot information and the blind spot region indicated by the second blind spot information (S330).

When it is determined that there is the first common blind spot region (Yes in S330), the determination controller 55 determines whether the first common blind spot region is an ignorable blind spot region (S331). The determination on whether it is the ignorable blind spot region is described later.

On the other hand, when the determination controller 55 determines that there is no first common blind spot region (No in S330), it means that there is no blind spot common to the blind spot region for the infrastructure sensor 31 and the blind spot region for the in-vehicle sensor 51. When no other object is detected, the determination controller 55 thus transmits the control signal to the actuator 58 of the vehicle 305 and allows the vehicle 305 to run (S332).

Even when it is No in step S330, the determination controller 55 stops the vehicle 305 from running if the other object is detected, and once no other object is detected, the determination controller 55 allows the vehicle 305 to run.

When it is determined that the first common blind spot region is the ignorable blind spot region (Yes in S331), the determination controller 55 allows the vehicle 305 to run (S332). The determination controller 55 then returns to step S321 and performs the same procedure.

On the other hand, when the determination controller 55 determines that the first common blind spot region is the unignorable blind spot region (No in S331), the procedure proceeds to step S333.

Since the determination on whether there is the possibility of collision between the other object and the vehicle 305 is similar to that in FIGS. 9 and 10, description thereof is omitted.

[Operations and Effects]

Next, operations and effects of the vehicle system 350 of this embodiment are described.

In this vehicle system 350, the information receiver 57 obtains the first blind spot information on the blind spot, which occurs when the object is observed from the infrastructure sensor 31, from the object detected by the infrastructure sensor 31. The detection recognizer 52 generates the second blind spot information on the blind spot, which occurs when the object is observed from the in-vehicle sensor 51 detecting the object. The blind spot information combination unit 54 can recognize that there is the first common blind spot region as the blind spot common in a case where the object is observed from the infrastructure sensor 31 and a case where the object is observed from the in-vehicle sensor 51, by combining the blind spot regions based on the first blind spot information and the second blind spot information. Using the first common blind spot region, this vehicle system 350 can allow the vehicle 305 to run safely.

The determination controller 55 can control the running of the vehicle 305 in accordance with the common blind spot information. For example, the determination controller 55 can stop the vehicle 305 from running when there is the first common blind spot region, and can allow the vehicle 305 to run when there is no first common blind spot region.

In the vehicle system 350 according to this embodiment, when the size of the first common blind spot region is equal to or smaller than the predetermined size, the determination controller 55 can determine that there is no other object present within the first common blind spot region. Thus, if the predetermined size as the minimum size of the other object to be detected is determined in advance, the predetermined size can be set as a threshold, and a small blind spot region can be thus ignored. In this case, the determination controller 55 can determine to allow the vehicle 305 to run.

When the size of the first common blind spot region is larger than the predetermined size, the determination controller 55 can determine that there is the other object present within the first common blind spot region. That is, because there is the possibility that the other object is present within the first common blind spot region, the determination controller 55 can determine to stop the vehicle 305 from running.

Thus, this vehicle system 350 can increase the chance of determining to allow the vehicle 305 to run, and decrease of the safety during the running of the vehicle 305, such as occurrence of collision between the vehicle 305 and an object, is hardly occurred. As a result, this vehicle system 350 enhances the running efficiency of the vehicle 305.

In the vehicle system 350 according to this embodiment, the determination controller 55 extracts the attention region based on at least the running direction and the speed of the object, and stops the vehicle 305 from running when there is the object present within the attention region. Thus, even when there is the other object in the blind spot region behind the object observed from the vehicle 305, the collision between the vehicle 305 and the other object can be avoided. Hence, the vehicle 305 can run safely.

In the vehicle system 350 according to this embodiment, since the first blind spot information and the second blind spot information are superimposed onto the road atlas information, the first common blind spot region can be mapped onto the road atlas information. Thus, the determination controller 55 can control the running of the vehicle 305 based on the road atlas information indicating the first common blind spot region.

In the vehicle system 350 according to this embodiment, since the moving speed of the object is slow when the arrival-predicted period Et is longer than the passage period t, it can be estimated that the possibility of collision between the vehicle 305 and the object is low. Since the moving speed of the object is fast when the arrival-predicted period Et is equal to or shorter than the passage period t, it can be estimated that there is the possibility of collision between the vehicle 305 and the second oncoming vehicle E02. Thus, the determination controller 55 performs control to allow the vehicle 305 to run when the arrival-predicted period Et is longer than the passage period t, and to stop the vehicle 305 from running when the arrival-predicted period Et is equal to or shorter than the passage period t. Hence, this vehicle system 350 allows the vehicle 305 to run safely.

In the vehicle system 350 according to this embodiment, since the object combination unit 53 combines the first object information and the second object information, the information such as location and speed of the object can be accurately detected. Thus, the location and speed and the like of the object can be checked.

(Other Modifications)

Although the vehicle system, the method of processing vehicle information, the recording medium storing a program, and the traffic system according to Embodiments 1 to 3 of the present disclosure are described, Embodiments 1 to 3 of the present disclosure is not limited to be the above Embodiments 1 to 3.

Figure 12:
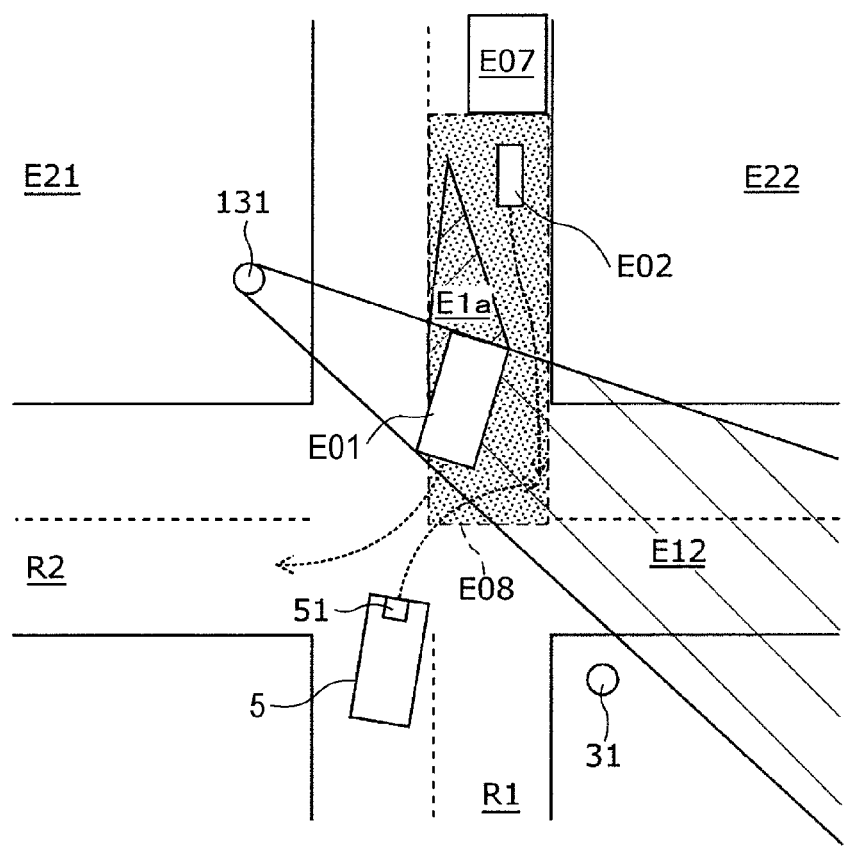
FIG. 12 is a schematic diagram illustrating blind spot regions, which occur when an object is observed from the in-vehicle sensor and multiple infrastructure sensors.

For example, in the above Embodiments 1 to 3, not only one infrastructure sensor but also multiple infrastructure sensors may be used. FIG. 12 is a schematic diagram illustrating blind spot regions, which occur when an object is observed from the in-vehicle sensor 51 and the multiple infrastructure sensors 31. Specifically, as illustrated in FIG. 12, there are two infrastructure sensors 31 and 131 around the intersection. When the infrastructure sensor 31 provides the first blind spot information to the vehicle 5, the first common blind spot region E1a can be extracted. Assuming that the infrastructure sensor 131 is installed on the diagonally opposite side of the intersection from the infrastructure sensor 31, the blind spot region due to the oncoming vehicle E01 observed from the infrastructure sensor 131 is E12. In this case, there is no blind spot region in which the first common blind spot region E10 common to the infrastructure sensor 131 and the vehicle 5 and the blind spot region E12 due to the infrastructure sensor 131 are overlapped. That is, it can be seen that all of the blind spot region as the blind spot for the vehicle 5 can be detected by the detection from the infrastructure sensors 31 and 131. Since the vehicle system combines the information form the multiple infrastructure sensors 31 by the detection recognizer in the vehicle system and checks if there is no blind spot left in the attention region by the determination controller, information on much more areas can be used in the determination controller for the region in which the multiple infrastructure sensors 31 are installed to allow detection.

In the above Embodiments 1 to 3, when the vehicle changes the direction for example, the determination controller may predict the trajectory of the oncoming vehicle based on the second detection information detected by the in-vehicle sensor and by using the information such as a blinking state of a blinker of the oncoming vehicle and the state of the oncoming vehicle indicating a lane on the road in which the oncoming vehicle is. For example, when the right blinker of the oncoming vehicle is turned on, it can be recognized that the oncoming vehicle will turn left as seen from the vehicle side. When the oncoming vehicle is in the right-turn lane, even though the blinker is not turned on, it can be recognized that the oncoming vehicle will turn left as seen from the vehicle side.

In the above Embodiments 1 to 3, the information generation unit detects the speed of the object. If the speed of the object is equal to or lower than a predetermined speed, the information generation unit may detect the speed of the other object. According to this configuration, the moving speed of the object can be determined as slow when the object moves at the predetermined speed or lower. In this case, if the object is observed from the infrastructure sensor side, the other object may be suddenly detected when getting out of the blind spot region due to the object. Thus, when the speed of the object is equal to or lower than the predetermined speed, the information generation unit estimates the speed of the other object. On the other hand, when the speed of the object is higher than the predetermined speed, the vehicle is highly likely to collide with the object regardless of the presence of the other object in the blind spot region, and thus stops running. This leads to safety running of the vehicle and enables the vehicle to implement the efficient operations.

In the above Embodiments 1 and 2, the vehicle system may have the road atlas database of Embodiment 3. In this case, the determination controller may read the road atlas information of the surroundings of the vehicle, may generate the information in which the first object information obtained from the infrastructure system and the first blind spot information are mapped onto the road atlas information, and may output this information to the external device.

In the above Embodiments 2 and 3, combining the above Embodiments 2 and 3 to Embodiment 1, the blind spot region due to the oncoming vehicle occurs under the environment where the vehicle is turning at the intersection and there is the first oncoming vehicle opposite to the vehicle, for example. In this case, the vehicle can determine whether the vehicle can turn even though there is the blind spot region for the vehicle at the intersection, by estimating whether there is the second oncoming vehicle hidden in the blind spot region. That is, just from the viewpoint of the safety, the vehicle may only have to be stopped; however, in terms of the operation efficiency of the vehicle, stopping the vehicle until the blind spot disappears is not realistic solution. In this way, the operation efficiency of the vehicle can be improved by determining whether the vehicle can turn.

In Embodiment 1 to 3, a processing unit is implemented by an LSI that is typically an integrated circuit. The LSI may be individually formed as chips, or one chip may be formed so as to include a part or all of the processing unit.

The technique of implementing an integrated circuit is not limited to the LSI and may be implemented by using a dedicated circuit or a general-purpose processor. A field programmable gate array (FPGA) that can be programmed after the manufacture of the LSI or a reconfigurable processor in which the connections and the settings of circuit cells disposed inside the LSI can be reconfigured may be used.

In the above Embodiments 1 to 3, a constituent may be configured from a dedicated hardware or implemented by executing a software program appropriate for the constituent. The constituent may be implemented by a program execution unit such as a CPU and a processor that reads and executes a software program recorded in a recording medium such as a hard disk and a semiconductor memory.

The numbers used above are all exemplified for specifically describing the present disclosure, and Embodiments 1 to 3 of the present disclosure are not limited to the exemplified numbers.

The division of the functional blocks in the block diagrams is an example. Multiple functional blocks may be implemented as one functional block, one functional block may be implemented in multiple, or a part of a function may be moved to another functional block. Functions of multiple functional blocks that have similar functions may be processed in parallel or in time-shared by single hardware or software.

The order of execution of the steps in the flowchart is exemplified for specifically describing the present disclosure and may be another order. A part of the above steps may be executed simultaneously (in parallel) with another step.

Although the vehicle system, the method of processing vehicle information, the recording medium storing a program, and the traffic system according to one or more aspects are described based on Embodiments 1 to 3, Embodiments 1 to 3 of the present disclosure are not limited to the multiple aspects. Without departing from the gist of the present disclosure, Embodiments 1 to 3 on which various modifications that can be thought by those skilled in the art are made and a form constructed by combining the different constituents from Embodiments 1 to 3 may also be included within a range of one or more aspects.

The present disclosure is applicable as a system that improves safety during vehicle running to avoid traffic accident and the like.

What is claimed is:

1. A vehicle system comprising:
processing circuitry; and
first storage including at least one set of instructions that, when executed by the processing circuitry, cause the processing circuitry to perform operations including:
obtaining first blind spot information from an infrastructure system having an infrastructure sensor detecting a surrounding object, the first blind spot information indicating a blind spot region due to the object observed from the infrastructure sensor;
generating second blind spot information indicating a blind spot region due to the object observed from an in-vehicle sensor detecting the object; and
outputting common blind spot information indicating a first common blind spot region common to the blind spot regions based on the first blind spot information and the second blind spot information to an external device.

2. The vehicle system according to claim 1, wherein the operations further include controlling running of a vehicle in accordance with the common blind spot information.

3. The vehicle system according to claim 2, wherein the operations further include
determining whether a size of the first common blind spot region is larger than a predetermined size, and
allowing the vehicle to run when the size of the first common blind spot region is equal to or smaller than the predetermined size, and
stopping the vehicle from running when the size of the first common blind spot region is larger than the predetermined size.

4. The vehicle system according to claim 2, wherein the operations further include
extracting an attention region for controlling the vehicle in accordance with at least a running direction and a speed of the object, and
stopping the vehicle from running when a second common blind spot region common to the blind spot region due to the object and the attention region occurs when observed from the in-vehicle sensor.

5. The vehicle system according to claim 2 further comprising a second storage that stores road atlas information for enabling the vehicle to run, wherein
the operations further include
at least superimposing the first blind spot information and the second blind spot information onto the road atlas information.

6. The vehicle system according to claim 3, wherein the operations further include
estimating a predicted trajectory from when the vehicle starts a predetermined running to when the vehicle finishes the predetermined running, and
determining whether an estimated arrival-predicted period until another object reaches the predicted trajectory is longer than an estimated passage period until the vehicle finishes passing the predicted trajectory, and
allowing the vehicle to run when the arrival-predicted period is longer than the passage period, and
stopping the vehicle from running when the arrival-predicted period is equal to or shorter than the passage period.

7. The vehicle system according to claim 1, wherein the operations further include
obtaining first object information on the object observed from the infrastructure sensor,
outputting second object information on the object observed from the in-vehicle sensor, and
combining the first object information and the second object information.

8. A method of processing vehicle information comprising:
obtaining first blind spot information from an infrastructure system having an infrastructure sensor detecting a surrounding object, the first blind spot information indicating a blind spot region due to the object observed from the infrastructure sensor;
generating second blind spot information indicating a blind spot region due to the object observed from an in-vehicle sensor detecting the object; and
outputting common blind spot information indicating a first common blind spot region common to the blind spot regions based on the first blind spot information and the second blind spot information to an external device.

9. A non-transitory computer-readable recording medium storing a program, wherein
the program, when executed in a computer, causes the computer to execute operations including:
obtaining first blind spot information from an infrastructure system having an infrastructure sensor detecting a surrounding object, the first blind spot information indicating a blind spot region due to the object observed from the infrastructure sensor;
generating second blind spot information indicating a blind spot region due to the object observed from an in-vehicle sensor detecting the object; and
outputting common blind spot information indicating a first common blind spot region common to the blind spot regions based on the first blind spot information and the second blind spot information to an external device.

10. A traffic system comprising:
an infrastructure system; and
a vehicle system, wherein
the infrastructure system includes
an infrastructure sensor that detects a surrounding object, and
first processing circuitry that, in operation, performs first operations including
outputting first blind spot information to a vehicle, the first blind spot information indicating a blind spot region due to the object observed from the infrastructure sensor, and the vehicle system includes
an in-vehicle sensor that detects the object, and
second processing circuitry that, in operation, performs second operations including
generating second blind spot information indicating a blind spot region due to the object observed from the in-vehicle sensor, and
outputting common blind spot information indicating a first common blind spot region common to the blind spot regions based on the first blind spot information and the second blind spot information to an external device.

11. The vehicle system according to claim 10, wherein the first operations further include
calculating a speed of another object presumed to be in the blind spot region due to the object, in accordance with a predetermined period for which the infrastructure sensor performs detection and a length of the blind spot region in a depth direction in which the object is observed from the infrastructure sensor, and
outputting speed information indicating the speed to the vehicle.

12. An infrastructure system that communicates with a vehicle system comprising:
an infrastructure sensor that detects a surrounding object; and
infrastructure processing circuitry that, in operation, performs operations including
extracting a blind spot region behind the object detected based on detection information obtained by the infrastructure sensor,
calculating a speed of another object presumed to be in the blind spot region due to the object, in accordance with a predetermined period for which the infrastructure sensor performs detection, and a length of the blind spot region in a depth direction in which the object is observed from the infrastructure sensor, and
outputting speed information indicating the speed to a vehicle.

13. The infrastructure system according to claim 12, wherein
the predetermined period is a detection period between a first time point and a second time point at each of which the object is detected, and
the length of the blind spot region is a sum of a distance moved by the object during the detection period and a length of the blind spot region at the first time point.

14. The infrastructure system according to claim 12, wherein
the predetermined period is a sampling cycle in which the infrastructure sensor performs detection periodically.

15. A method of processing infrastructure information in an infrastructure system comprising:
causing an infrastructure sensor to detect a surrounding object;
extracting, using infrastructure processing circuitry, a blind spot region due to the object detected based on detection information obtained by the infrastructure sensor;
calculating a speed of another object presumed to be in the blind spot region due to the object, in accordance with a predetermined period for which the infrastructure sensor performs detection, and a length of the blind spot region in a depth direction in which the object is observed from the infrastructure sensor; and
outputting speed information indicating the speed to a vehicle.

* * * * *